US012542073B2

United States Patent
Kiley et al.

(10) Patent No.: US 12,542,073 B2
(45) Date of Patent: Feb. 3, 2026

(54) TASK TRAINER FOR OPEN CHEST CARDIAC MASSAGE

(71) Applicant: University of Florida Research Foundation, Incorporated, Gainesville, FL (US)

(72) Inventors: Sean P. Kiley, Newberry, FL (US); Anthony Destephens, Alachua, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 1091 days.

(21) Appl. No.: 17/303,988

(22) Filed: Jun. 11, 2021

(65) Prior Publication Data

US 2021/0390883 A1    Dec. 16, 2021

Related U.S. Application Data

(60) Provisional application No. 63/038,313, filed on Jun. 12, 2020.

(51) Int. Cl.
*G09B 23/32* (2006.01)
*A61H 31/00* (2006.01)

(52) U.S. Cl.
CPC .......... *G09B 23/32* (2013.01); *A61H 31/007* (2013.01); *A61H 2201/5061* (2013.01)

(58) Field of Classification Search
CPC .... G09B 23/32; G09B 23/288; G09B 23/303; A61H 31/007; A61H 2201/5061
See application file for complete search history.

(56) References Cited

U.S. PATENT DOCUMENTS

| 5,374,194 A * | 12/1994 | Walcerz | G09B 23/288 434/265 |
| 2012/0034587 A1 * | 2/2012 | Toly | G09B 23/30 434/267 |

(Continued)

FOREIGN PATENT DOCUMENTS

WO    WO-2012047504 A1 *   4/2012   ........... G09B 23/288

OTHER PUBLICATIONS

Ruth G Nagassa, Paul G McMenamin, Justin W Adams, Michelle R Quayle, Jeffrey V Rosenfeld; Advanced 3D printed model of middle cerebral artery aneurysms for neurosurgery simulation; Dec. 5, 2019; 3D Print Med (Year: 2019).*

(Continued)

*Primary Examiner* — Kang Hu
*Assistant Examiner* — Anthony James Bulthuis
(74) *Attorney, Agent, or Firm* — ALSTON & BIRD LLP

(57) ABSTRACT

Described is an open chest cardiac massage (OCCM) task trainer. The OCCM task trainer includes a simulated chest cavity and a simulated heart having a form factor, feel, dimensions, mechanical properties, deformability, and other characteristics that are substantially equivalent to a human heart. The OCCM task trainer includes componentry for structural support of other components and for facilitating navigation of the chest cavity by a trainee prior to simulating OCCM. The OCCM task trainer includes a simulated skin and sternum configured to be surgically separated and reformed for repeated anterior access to the chest cavity. The task trainer includes one or more sensors placed on, about, and/or within the simulated heart in order to determine the effectiveness of OCCM as simulated by a trainee. Computing circuitry and methods are described for providing real-time feedback to a trainee about the effectiveness of simu- (Continued)

lated OCCM relative to best practices for OCCM procedures.

20 Claims, 16 Drawing Sheets

(56) References Cited

U.S. PATENT DOCUMENTS

| | | | | |
|---|---|---|---|---|
| 2013/0330701 A1* | 12/2013 | Rubinstein | ............ | G09B 23/288 |
| | | | | 434/272 |
| 2014/0220532 A1* | 8/2014 | Ghez | ................. | G09B 23/30 |
| | | | | 434/272 |
| 2019/0279531 A1* | 9/2019 | Cobb | ................. | G09B 23/32 |

OTHER PUBLICATIONS

Screen captures from The Chamberlain Group, webpage < https://www.thecgroup.com/product/trauma-thoracotomy-trainer/> 2019 , retrieved from Internet Archive Wayback Machine (Year: 2019).*

Bohnen, Jordan D. et al. *High-Fidelity Emergency Department Thoracotomy Simulator With Beating-Heart Technology and OSATS Tool Improves Trainee Confidence and Distinguishes Level Of Skill,* Journal of Surgical Education, vol. 75, No. 5, Sep./Oct. 2018, pp. 1357-1366, DOI: 10.1016/j.jsurg.2018.02.001.

* cited by examiner

TASK TRAINER FOR OPEN CHEST CARDIAC MASSAGE

CROSS-REFERENCE TO RELATED APPLICATIONS

The present application claims priority to, and the benefit of, U.S. Provisional Application No. 63/038,313, filed Jun. 12, 2020 and entitled "Task Trainer for Open Chest Cardiac Massage," the entire disclosures of which are hereby incorporated herein by reference in their entireties.

BACKGROUND

When providing medical care to cardiac surgical patients, medical professionals such as surgeons, intensivists, physician assistants, nurse practitioners, and others, may perform or assist with procedures, such as a sternotomy, during which part or all of a patient's sternum is separated, penetrated, or otherwise bypassed to gain access to the patient's chest cavity. Such procedures allow for open chest cardiac massage rather than conducting techniques such as closed chest compressions or the like when resuscitating patients in cardiac arrest. However, there are few opportunities for medical professionals to receive adequate training on open chest cardiac massage techniques, which leads to a general lack of experience, familiarity, and comfort, among medical professionals, with performing such techniques, especially in emergent situations.

BRIEF SUMMARY

Described is an open chest cardiac massage (OCCM) task trainer. The OCCM task trainer includes a simulated chest cavity comprising of a rib cage, lungs, diaphragm and heart with vasculature. The simulated heart having a form factor, feel, dimensions, mechanical properties, deformability, and other characteristics that are substantially equivalent to a human heart. The OCCM task trainer includes componentry for structural support of other components and for facilitating navigation of the chest cavity by a trainee prior to simulating OCCM. The OCCM task trainer includes a simulated skin and sternum configured to be surgically separated and reformed for repeated anterior access to the chest cavity. The task trainer includes one or more sensors placed on, about, and/or within the simulated heart in order to determine the effectiveness of OCCM as simulated by a trainee. Computing circuitry and methods are described for providing real-time feedback to a trainee about the effectiveness of simulated OCCM relative to best practices for OCCM procedures.

In some embodiments, an open chest cardiac massage task trainer can be provided that comprises a simulated chest cavity defining an opening at a top of the simulated chest cavity comprising of a rib cage, lungs, diaphragm and containing a molded heart, the molded heart comprising a bulb within the molded heart, the bulb being in fluidic communication with an inlet port and an outlet port of the molded heart; one or more sensors disposed on or within the molded heart and configured to sense the force, speed, rate, depth, frequency, and/or direction of compression during open chest cardiac massage training; analysis circuitry configured to receive sensor data from the one or more sensors and interpret the sensor data to generate one or more compression characteristics. In some embodiments, the open chest cardiac massage task trainer can further comprise sternum portions disposed above the simulated chest cavity; and a rejuvenable polymer gel disposed over the sternum portions to simulate epidermis and subcutaneous tissue, the rejuvenable polymer gel being configured to be surgically cut to gain access to the surgically wired sternum portions disposed above the simulated chest cavity. In some embodiments, the open chest cardiac massage task trainer can further comprise one or more fluid reservoirs configured to contain or receive a fluid, each of the one or more fluid reservoirs being in fluidic communication with the inlet port or the outlet port of the molded heart; and a flow sensor or flow meter in fluidic communication with the outlet port of the molded heart and configured to measure the flow rate and volume of fluid flowing through the outlet port of the molded heart, wherein the analysis circuitry is further configured to receive flow rate and volume data from the flow sensor. In some embodiments, the open chest cardiac massage task trainer can further comprise a display configured to receive, from the analysis circuitry, the one or more compression characteristics and to display the one or more compression characteristics. In some embodiments, at least one of the one or more sensors can comprise an accelerometer. In some embodiments, at least one of the one or more sensors comprises one or more of: a displacement sensor, a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor. In some embodiments, the rejuvenable polymer gel can be or comprise a ballistics gel.

In some embodiments, a method can be carried out that comprises: forming a deformable bulb configured to cause a fluid to flow therethrough when compressed; forming a molded heart, about the deformable bulb, from a deformable material, the molded heart defining a first channel through a first side of the molded heart and a second channel through a second side of the molded heart, the first and second channels being in fluidic communication with the deformable bulb; disposing a first one-way valve in the first channel and a second one-way valve in the second channel to allow for unidirectional flow of fluid through the first and second channels and the deformable bulb; and disposing one or more sensors on a surface of the molded heart, the one or more sensors configured to sense acceleration, force, bending, or flexure. In some embodiments, the method can further comprise forming a simulated chest cavity having an inner volume and defining an opening through a top portion of the simulated chest cavity; coupling the simulated chest cavity to one or more molded spinal column sections; and disposing the molded heart within the inner volume of the simulated chest cavity. In some embodiments, the method can further comprise providing one or more fluid reservoirs in fluidic communication with the bulb within the molded heart, the one or more fluid reservoirs being configured to contain a fluid, provide the fluid to the bulb within the molded heart, or receive the fluid from the bulb within the molded heart. In some embodiments, the method can further comprise disposing one or more molded sternum portions and a multilayer and durometer rejuvenable polymer gel across the opening defined in the top portion of the simulated chest cavity. As used herein, "durometer" refers to materials, such as rubbers, elastomers, polymers, plastics, gels, or the like, that have a hardness and therefore resist indentation or plastic deformation in response to a deforming force. As used herein, "rejuvenable" refers to a characteristic of a material to be able to be restored to an earlier or an original shape, form factor, dimensions, and/or mechanical properties. By way of example only, the rejuvenable polymer gel may be operable to be cut during use of the task trainer to access the opening into the chest cavity, and after use of the task trainer, the rejuvenable polymer gel may be thermally, chemically, and/or physically manipulated in order to reform the uncut polymer gel for re-use as part of the task trainer. In some embodiments, the rejuvenable polymer gel can be or comprise a ballistics gel. As used herein, "simulated" and "molded" both refer to a material, formed in such a way as to reflect the shape, dimensions, and characteristics of a corresponding part or piece of the human body being simulated. For example, as described herein, a "molded heart" and a "simulated heart" may be used to describe similar or the same element of the open chest cardiac massage task trainer.

In some embodiments, a method can be carried out that comprises providing a task trainer comprising: a simulated chest cavity defining an opening at a top of the simulated chest cavity and containing a rib cage, lungs, diaphragm and a molded heart, the molded heart comprising a bulb within the molded heart, the bulb being in fluidic communication with an inlet port and an outlet port of the molded heart and a reservoir configured to retain and provide a fluid; one or more sensors disposed on or within the molded heart and configured to sense the force, speed, rate, depth, frequency, and/or direction of compression during open chest cardiac massage training; a flow sensor configured to sense the flow of fluid through the outlet port; analysis circuitry configured to receive sensor data from the one or more sensors and flow data from the flow sensor, and further configured to interpret the sensor data and the flow data to generate one or more compression suitability indicia; and a display configured to receive display instructions from the analysis circuitry and to display the one or more compression suitability indicia for viewing by a trainee; the method further comprising: in an instance in which the trainee manually compresses the molded heart during a time period and causes communication of the fluid from the reservoir through the bulb within the molded heart, receiving, at the analysis circuitry, the sensor data and the flow data associated with the time period; interpreting the sensor data and the flow data to generate the one or more compression suitability indicia; and sending display instructions from the analysis circuitry to the display to cause the display to display the one or more compression suitability indicia.

In some embodiments, an apparatus can be provided that comprises a deformable bulb defining an inner volume, the bulb further defining a first opening on a first side of the bulb and a second opening on a second side of the bulb; a first one-way valve in fluidic communication with the first opening of the bulb and a second one-way valve in fluidic communication with the second opening the bulb; a deformable material disposed about the bulb to form a molded heart, the deformable material also forming a first channel into which at least part of the first one-way valve is disposed and a second channel into which at least part of the second one-way valve is disposed, wherein the molded heart is dimensioned and configured to simulate a human heart; and one or more sensors disposed on and/or within the molded heart and configured to sense at least one of: a compression force, a compression speed, a compression rate, a compression depth, a compression frequency, a compression direction, a compression volume output, finger placement, or palm placement during open chest cardiac massage training. In some embodiments, the apparatus can further comprise analysis circuitry configured to receive sensor data from the one or more sensors and interpret the sensor data to generate one or more compression characteristics. In some embodiments, the apparatus can further comprise a simulated chest cavity defining an opening at a top of the simulated chest cavity and an inner volume configured to retain a rib cage, lungs, a diaphragm, and the molded heart. In some embodiments, the apparatus can further comprise sternum portions disposed above the simulated chest cavity and substantially over or within said opening; and a multilayer and durometer rejuvenable polymer gel disposed over the sternum portions to simulate skin and subcutaneous tissue, the rejuvenable polymer gel being configured to be surgically cut to gain access to the sternum portions disposed above the simulated chest cavity. In some embodiments, the apparatus can further comprise one or more fluid reservoirs configured to contain or receive a fluid, each of the one or more fluid reservoirs being in fluidic communication with the inlet port or the outlet port of the molded heart; a flow sensor or flow meter in fluidic communication with the outlet port of the molded heart and configured to measure the flow rate and volume of fluid flowing through the outlet port of the molded heart, wherein the analysis circuitry is further configured to receive flow rate data from the flow sensor or flow meter; and a display configured to receive, from the analysis circuitry, the one or more compression characteristics and to display the one or more compression characteristics. In some embodiments, at least one of the one or more sensors comprises one or more of: an accelerometer, a flex sensor, a bend sensor, a force sensor, a force transducer, a pressure sensor, a pressure transducer, a load sensor, a hydraulic force sensor, a displacement sensor, a pneumatic force sensor, a piezoelectric force sensor, a capacitive force sensor, or a force sensitive resistor.

According to another embodiment, an open chest cardiac massage (OCCM) task trainer can be provided that comprises a simulated chest cavity defining an inner volume and an opening in a top surface of the simulated chest cavity; a simulated heart disposed within the inner volume of the simulated chest cavity, the simulated heart comprising a bulb surrounded by a deformable heart material, the bulb being in fluidic communication with an inlet port and an outlet port of the simulated heart; one or more sensors disposed on or within the simulated heart and configured to sense one or more compression characteristics during a simulated open chest cardiac massage procedure; and analysis circuitry in operable communication with the one or more sensors, the analysis circuitry configured to determine, from the one or more compression characteristics, one or more compression suitability indicia.

In some embodiments, the one or more compression characteristics can comprise at least one of: a force of compression, a speed of compression, a rate of compression, a depth of compression, a frequency of compression, an angle of compression, a compression direction, a compression volume output, a trainee's finger placement during the simulated open chest cardiac massage procedure, or a trainee's palm placement during the simulated open chest cardiac massage procedure.

In some embodiments, the OCCM task trainer can comprise one or more sternum portions disposed above the simulated chest cavity. In some embodiments, the OCCM task trainer can comprise a multilayer and durometer rejuvenable polymer gel disposed over the sternum portions to simulate skin and subcutaneous tissue, the multilayer and durometer rejuvenable polymer gel being configured to be surgically cut to gain access to the sternum portions disposed above the simulated chest cavity. In some embodiments, the OCCM task trainer can comprise one or more fluid reservoirs configured to contain or receive a fluid, each of the one or more fluid reservoirs being in fluidic communication with the inlet port or the outlet port of the simulated heart. In some embodiments, the OCCM task trainer can comprise a flow sensor or flow meter in fluidic communication with the outlet port of the simulated heart and configured to measure the flow rate and volume of fluid flowing through the outlet port of the simulated heart. In some embodiments, the analysis circuitry can be further configured to receive flow rate data from the flow sensor or the flow meter. In some embodiments, the rejuvenable polymer gel may be or comprise a ballistics gel.

In some embodiments, the OCCM task trainer can comprise a display configured to display the one or more compression suitability indicia.

In some embodiments, at least one of the one or more sensors comprises an accelerometer. In some embodiments, at least one of the one or more sensors comprises one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

In some embodiments, the OCCM task trainer can comprise a simulated rib cage disposed within the inner volume of the simulated chest cavity. In some embodiments, the OCCM task trainer can comprise one or more simulated lungs disposed within the inner volume of the simulated chest cavity. In some embodiments, the OCCM task trainer can comprise a simulated diaphragm disposed within the inner volume of the simulated chest cavity.

In some embodiments, at least one of the inlet port or the outlet port of the simulated heart comprises a one-way valve. In some embodiments, the simulated heart is dimensioned and configured to simulate a human heart.

According to another embodiment, a method for forming an open chest cardiac massage task trainer can be carried out, the method comprising forming a deformable bulb configured to cause a fluid to flow therethrough when compressed; forming, about the deformable bulb, from a deformable material, a simulated heart defining a first channel through a first side of the simulated heart and a second channel through a second side of the simulated heart, the first and second channels being in fluidic communication with the deformable bulb; disposing a first one-way valve in the first channel and a second one-way valve in the second channel to allow for unidirectional flow of fluid through the first and second channels and the deformable bulb; disposing one or more sensors on a surface of the simulated heart, the one or more sensors configured to sense one or more compression characteristics; and placing the one or more sensors in operable communication with analysis circuitry configured to analyze said one or more compression characteristics and determine one or more compression suitability indicia.

In some embodiments, the one or more compression characteristics can comprise at least one of: a force of compression, a speed of compression, a rate of compression, a depth of compression, a frequency of compression, an angle of compression, a compression direction, a compression volume output, a trainee's finger placement during the simulated open chest cardiac massage procedure, or a trainee's palm placement during the simulated open chest cardiac massage procedure.

In some embodiments, the method of forming the OCCM task trainer can further comprise forming a simulated chest cavity having an inner volume and defining an opening through a top portion of the simulated chest cavity. In some embodiments, the method of forming the OCCM task trainer can further comprise coupling the simulated chest cavity to one or more simulated spinal column sections. In some embodiments, the method of forming the OCCM task trainer can further comprise disposing the simulated heart within the inner volume of the simulated chest cavity.

In some embodiments, the method of forming the OCCM task trainer can comprise providing one or more fluid reservoirs configured to contain a fluid; and placing the bulb and the first and second channels of the simulated heart in fluidic communication with the one or more fluid reservoirs.

In some embodiments, the method of forming the OCCM task trainer can comprise providing one or more fluid reservoirs in fluidic communication with the bulb within the simulated heart, the one or more fluid reservoirs being configured to contain a fluid, provide the fluid to the bulb within the simulated heart, or receive the fluid from the bulb within the simulated heart.

In some embodiments, the method of forming the OCCM task trainer can further comprise disposing one or more simulated sternum portions and a multilayer and durometer rejuvenable polymer gel across the opening defined in the top portion of the simulated chest cavity. In some embodiments, the multilayer and durometer rejuvenable polymer gel can be or comprise a ballistics gel.

According to another embodiment, a method for using an open chest cardiac massage (OCCM) task trainer can be carried out, the method comprising providing a task trainer. In some embodiments, the OCCM task trainer can comprise a simulated chest cavity defining an inner volume and an opening in a top surface of the simulated chest cavity; a simulated heart disposed within the inner volume of the simulated chest cavity, the simulated heart comprising a bulb surrounded by a deformable heart material, the bulb being in fluidic communication with an inlet port and an outlet port of the simulated heart and a reservoir configured to retain and provide a fluid; one or more sensors disposed on or within the simulated heart and configured to sense the force, speed, rate, depth, frequency, and/or direction of compression during open chest cardiac massage training; a flow sensor configured to sense a rate of flow of the fluid through the outlet port; analysis circuitry configured to receive sensor data from the one or more sensors and flow data from the flow sensor, and further configured to interpret the one or more compression characteristics and fluid flow rate data from the flow sensor to generate one or more compression suitability indicia. In some embodiments, the analysis circuitry can be configured to receive sensor data from the one or more sensors and flow data from the flow sensor, and further configured to interpret the sensor data and the flow data to generate one or more compression suitability indicia; and a display configured to receive display instructions from the analysis circuitry and to display the one or more compression suitability indicia.

In some embodiments, the method of using the OCCM task trainer can further comprise, in an instance in which a trainee manually compresses the simulated heart during a time period and causes communication of the fluid from the reservoir through the bulb within the simulated heart, receiving, at the analysis circuitry, the sensor data and the flow data associated with the time period. In some embodiments, the method of using the OCCM task trainer can further comprise interpreting the sensor data and the flow data to generate the one or more compression suitability indicia.

In some embodiments, the OCCM task trainer can further comprise one or more sternum portions disposed above the simulated chest cavity; and a multilayer and durometer rejuvenable polymer gel disposed over the sternum portions to simulate skin and subcutaneous tissue, the multilayer and durometer rejuvenable polymer gel being configured to be surgically cut to gain access to the sternum portions disposed above the simulated chest cavity. In some embodiments, the OCCM task trainer can further comprise one or more fluid reservoirs configured to contain or receive a fluid, each of the one or more fluid reservoirs being in fluidic communication with the inlet port or the outlet port of the simulated heart; and a flow sensor or a flow meter in fluidic communication with the outlet port of the simulated heart and configured to measure the flow rate and volume of fluid flowing through the outlet port of the simulated heart. In some embodiments, the analysis circuitry can be further configured to receive flow rate data from the flow sensor or flow meter.

In some embodiments, the method of using the OCCM task trainer can further comprise sending display instructions from the analysis circuitry to the display to cause the display to display the one or more compression suitability indicia.

In some embodiments, the one or more sensors comprises one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

BRIEF DESCRIPTION OF THE DRAWINGS

The accompanying drawings, which constitute a part of the description, illustrate embodiments of the present invention and, together with the description thereof, serve to explain the principles of the present invention. Drawings and components thereof are not drawn to scale either with regard to an external reference or an internal reference, nor are components within or between drawings drawn to scale with regard to each other. The form factor, dimensions, position, orientation, presence, absence, and/or operability of components in the accompanying drawings is not limited to those embodiments illustrated, but includes many other embodiments and variants, as would be readily apparent to one of ordinary skill in the art.

DETAILED DESCRIPTION

Figure 1:
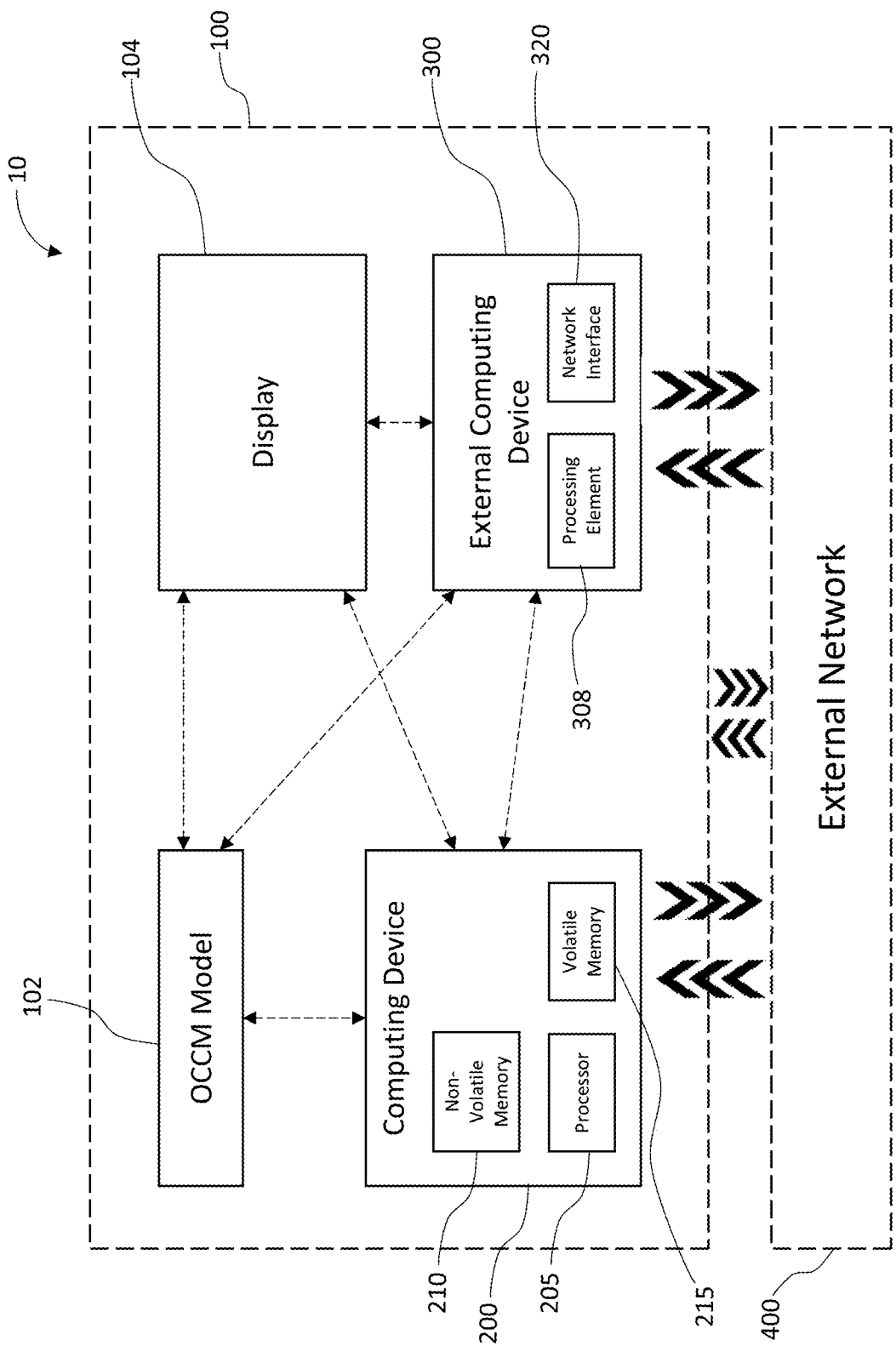
FIG. 1 provides an example of a system for simulating open chest cardiac massage techniques, according to some embodiments described herein.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as -exemplary" or an "example," it should be understood that refers to a non-exclusive example;

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the other computing device or may be received indirectly via one or more computing devices, such as, for example, one or more servers, relays, routers, network access points, base stations, and/or the like.

As used herein, the term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term "circuitry" refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

As used herein, the term "computing device" refers to a specialized, centralized device, network, or system, comprising at least a processor and a memory device including computer program code, and configured to provide guidance or direction related to the charge transactions carried out in one or more charging networks.

As used herein, the terms "about," "substantially," and "approximately" generally mean plus or minus 10% of the value stated, e.g., about 250 μm would include 225 μm to 275 μm, about 1,000 μm would include 900 μm to 1,100 μm.

The human thorax (also described herein as the chest cavity) comprises a pair of lungs protected by ribs and connected therebetween by a sternum in the anterior region and by scapula and a spinal column in the posterior region and a diaphragm at the inferior region. Within the chest cavity is the heart.

During a number of various medical and surgical procedures, medical or surgical practitioners may need to fully access the chest cavity through the sternum. When a surgeon or the like performs a sternotomy, or other open chest cavity surgical procedure to access the heart, manual, visual, tactile, and/or spatial knowledge and practical familiarity with relative spatial positioning of organ and skeletal landmarks is necessary. During dissection, the surgeon may hold the lungs out of the way bilaterally, saw or clip through the sternum, incise through the pericardium, and gain manual access to the heart, while taking care to avoid the phrenic and intercostal nerves and vascular injury.

Following such medical and surgical procedures, and either before or after the patient's chest cavity is closed and wired or sewn shut, the patient may suffer cardiac arrest or other cardiac failure. When the chest cavity has been previously opened and such cardiac arrest or failure subsequently occurs, closed cardiac compressions may not be possible or effective, and the open chest cardiac massage techniques may be more suitable and/or may reduce secondary damage to internal organs, the ribs, the sternum, tissues, vessels, veins, nerves, and/or the like. During such a procedure, the surgeon or other medical professional re-opens the patient by cutting or clipping through the sutures or wires used to close the patient, if needed, navigates one or both of their hands through the opening to the chest cavity, and applies manual compressions to the patient's heart using their hand or hands to stimulate the flow of blood through the heart, e.g., the right heart.

However, the open chest cardiac massage (OCCM) procedure can be quite complex for a variety of reasons and there are few opportunities for medical professionals to receive adequate training on OCCM techniques. Available training and practice using cadavers is typically inadequate and the only existing training equipment are designed to train medical professionals on post-thoracotomy open cardiac massage, which enters through the side of the thorax instead of through the sternum and requires knowledge of completely different anatomical landmarks and manual navigation to the heart.

Since it is not typically possible to gain sufficient practice with OCCM techniques using cadavers and surgeons often are not able to gain sufficient practice with living patients during surgical procedures, access to a realistic task trainer is needed in order to become proficient with the OCCM techniques. A realistic task trainer may provide surgeons and other medical professionals with opportunities to simulate OCCM techniques such that, when the need for OCCM arises following an open-chest surgical procedure such as a sternotomy, the trained medical professional can carry out OCCM with increased skill, with increased familiarity with the anatomical landmarks within the chest cavity, with increase familiarity with the compressive technique, depth, force, and frequency needed to affect OCCM in an effective manner. Said otherwise, in order for such a task trainer to provide a user with sufficient practice with OCCM techniques, the task trainer should be sufficiently anatomically accurate, should monitor the effectiveness of a user's OCCM technique, and should provide the user with sufficient feedback about the effectiveness of their OCCM technique. As such, described herein are systems, apparatuses, task training equipment, and associated methods for users to practice OCCM techniques.

Referring now to FIG. 1, a system 10 for facilitating training by medical professionals of OCCM techniques, according to a particular embodiment. The system 10 comprises a task trainer 100 comprising an OCCM model 102 in operable communication with one or more of a display 104, a computing device 200, and an external computing device 300. Particular details of at least one embodiment of the OCCM model 102 is provided below, e.g., with regard to FIGS. 10A and 10B. A general description of the OCCM model 102 is provided below with regard to the embodiment shown in FIG. 1, including descriptions of particular components not shown in the figure.

In some embodiments, the OCCM model 102 comprises a physical model of a torso that defines a thoracic cavity (also described herein as a chest cavity) with a simulated heart contained inside the chest cavity. The chest cavity can be mounted on a skeletal framework that comprises a spinal column, a set of ribs, and a sternum. The sternum can be covered by a material that realistically simulates the epidermis and tissue layers between the epidermis and the sternum such that the user can make a surgical cut through the simulated epidermis and tissue, separate the sternum portions, and access the inside of the chest cavity.

In some embodiments, the OCCM model 102 can comprise a molded heart that is dimensioned and configured to realistically simulate a typical human heart. In some embodiments, the molded heart can comprise one or more deformable portions that are configured to deform in response to manual compressions by a user of the task trainer 100. In some embodiments, the molded heart comprises one or more cavities, passageways, or lumens defined within the molded heart or defined therethrough. In some embodiments, the molded heart can be operably, physically, fluidically, removably, or otherwise coupled to one or more fluid reservoirs, one or more flow sensors, one or more flow meters, one or more pressure sensors, one or more channels, and/or the like. In some embodiments, the molded heart is configured such that when a user manually compresses the molded heart, the manual compression causes the application or formation of hydraulic pressure or at least a partial vacuum upon release, within the cavity of the molded heart or a passageway or lumen defined within or about the molded heart. In some embodiments, the hydraulic pressure or at least partial vacuum can cause the flow of a fluid, such as a blood-like fluid or the like, into, through, or out of the molded heart. Causing such a flow can simulate the movement of blood through the ventricles and chambers of a patient's heart when the medical professional conducts an OCCM procedure on a living patient.

In some embodiments, the molded heart can be designed using a modeling program such as Rhinoceros 5. In some embodiments, a heart mold can be 3D printed out of any suitable material, such as but not limited to polylactic acid (PLA) or the like, based on the model from the modeling program. In some embodiments, a molding compound or material such as silicone can be disposed within the heart mold to form the molded heart.

In some embodiments, the OCCM model 102 can comprise one or more sensors disposed on, about, and/or within the chest cavity. In some embodiments, the OCCM model 102 can comprise one or more sensors disposed on, about, and/or within the heart. In some embodiments, the one or more sensors can be electrically coupled to interpretation circuitry such as a computing device 200, an external computing device 300, a processor, computing device, or the like. In some embodiments, the one or more sensors can comprise pressure sensors, deformation sensors, displacement sensors, stress sensors, flexure sensors, accelerometers, train sensors, and the like. In some embodiments, the one or more sensors can be configured to sense, monitor, measure, estimate, calculate, or otherwise determine the effectiveness of compressions during use of the task trainer 100 by the user. The effectiveness of compressions can be represented by one or more compression indicators. In some embodiments, the OCCM model 102 can therefore be in real-time or substantially real-time communication with the computing device 200 or the like. The OCCM model 102 can provide sensor data to the interpretation circuitry, which can analyze the sensor data to determine the one or more compression indicators. The one or more compression indicators can be provided to a display 104 and/or other analysis circuitry or the like. The one or more compression indicators can be presented to the user/trainee of the task trainer 100 on the display 104 in order to indicate to the user/trainee whether the OCCM compression technique, compression rate, compression placement, compression force, and other characteristics of the OCCM technique is suitable.

In some embodiments, the analysis circuitry or the like can comprise a processor element 205 or a processor 380, a memory (such as a non-volatile 210 or a volatile memory 215), and/or a network interface 320. In some embodiments, the task trainer 100 or the like can be in communication with an external network 400, such as a cloud computing device, cloud networking environment, and/or the like. The computing device 200 and external computing device 300, each of which can be configured to carry out some or all processes of any of the approaches, methods, analyses, or calculations described herein, are described below in more detail with respect to FIGS. 2 and 3.

Figure 2:
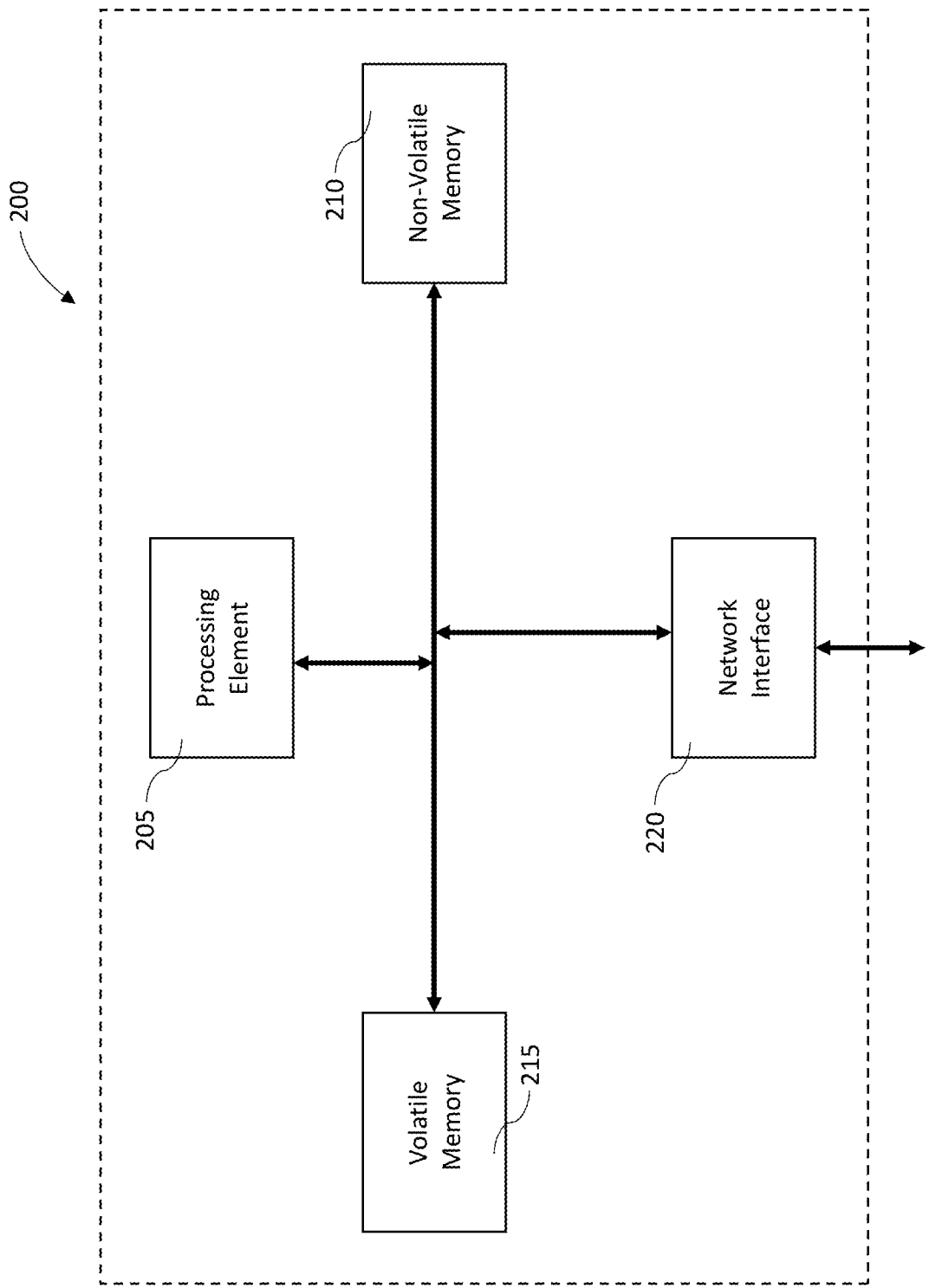
FIG. 2 provides an example computing entity configured to carry out part or all of at least some of the various processes, algorithms, and methods described herein, according to some embodiments described herein.

FIG. 2 provides a schematic of a computing device 200 according to at least one embodiment of the present disclosure. In some embodiments, the computing device 200 can be similar to or the same as the external computing device 300. In some embodiments, the computing entity 200 can comprise the external computing device 300, or vice versa. In some embodiments, the computing device 200 and/or the external computing device 300 can be configured to carry out all or part of any of the methods, algorithms, processes, or approaches described herein, according to a set of instructions or according to computer program code. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in at least one embodiment, the computing device 200 may include may include or be in communication with one or more of a processing element 205 (also referred to as processors, processing circuitry, and/or similar terms used herein interchangeably) that communicate with other elements within the computing device 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the computing device 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile memory 210, such as non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the computing device 200 may further include or be in communication with volatile media (also referred to as volatile storage, memory, memory storage, memory circuitry and/or similar terms used herein interchangeably). In one embodiment, the volatile storage or memory may also include one or more volatile memory 215, such as volatile storage or memory media including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the computing device 200 with the assistance of the processing element 205 and operating system.

In at least one embodiment, the computing device 200 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing device 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the computing device 200 may include or be in communication with one or more input elements, such as a keyboard input, a mouse input, a touch screen/display input, motion input, movement input, audio input, pointing device input, joystick input, keypad input, and/or the like. The computing device 200 may also include or be in communication with one or more output elements (not shown), such as audio output, video output, screen/display output, motion output, movement output, and/or the like.

Exemplary External Computing Entity

Figure 3:
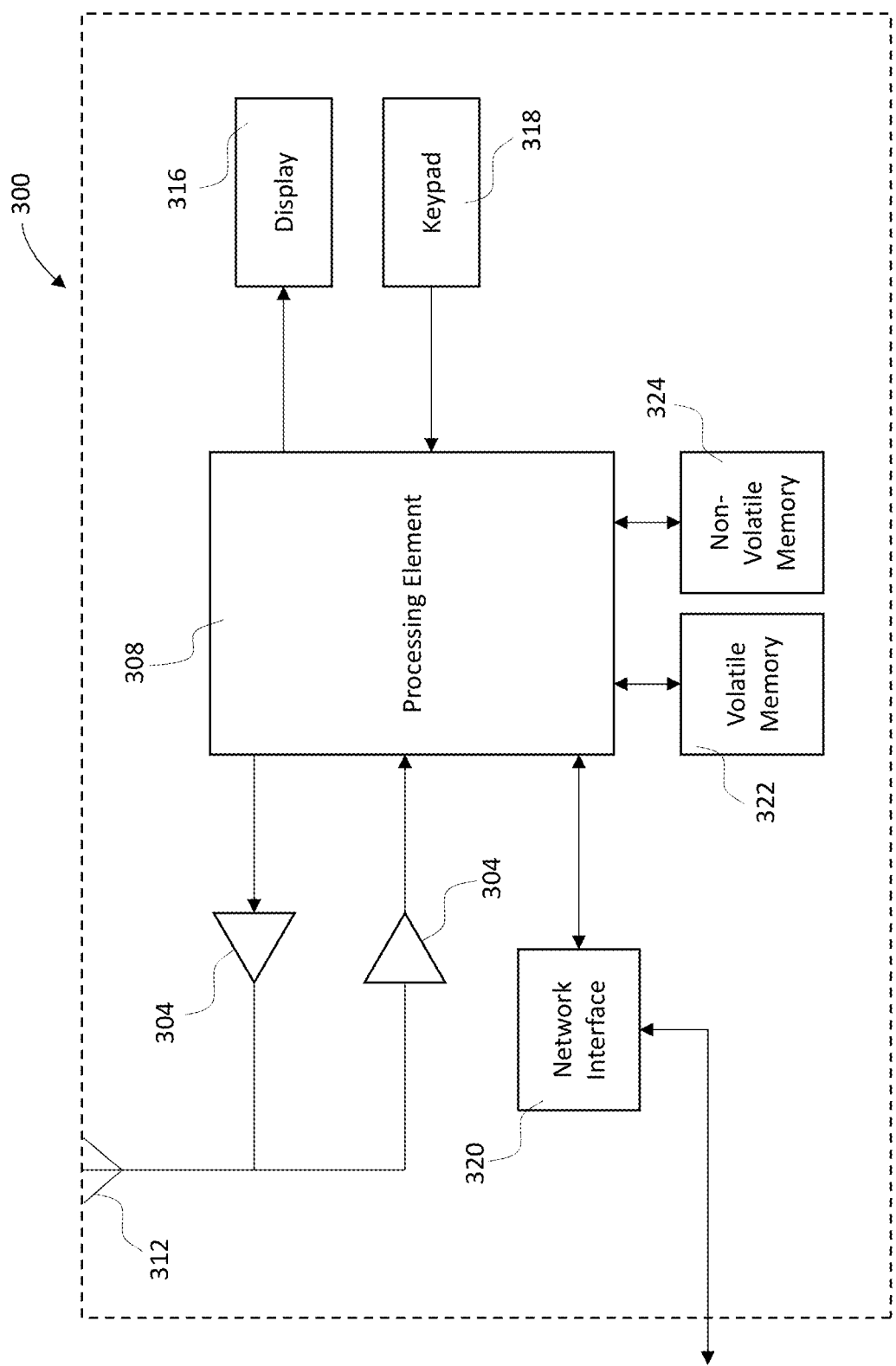
FIG. 3 provides an example computing entity configured to carry out part or all of at least some of the various processes, algorithms, and methods described herein, according to some embodiments described herein.

FIG. 3 provides an illustrative schematic representative of an external computing device 300 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. An external computing device 300 can be operated by various parties. As shown in FIG. 3, the external computing device 300 can comprise an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing device 300 may be capable of operating with one or more air interface standards, communication protocols, modulation types, and access types. More particularly, the external computing device 300 may operate in accordance with any of a number of wireless communication standards and protocols, such as those described above with regard to the computing device 200. In a particular embodiment, the external computing device 300 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing device 300 may operate in accordance with multiple wired communication standards and protocols, such as those described above with regard to the computing device 200 via a network interface 320.

Via these communication standards and protocols, the external computing device 300 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing device 300 can also download changes, add-ons, and updates, for instance, to its firmware, software (e.g., including executable instructions, applications, program modules), and operating system.

According to one embodiment, the external computing device 300 may include location determining aspects, devices, modules, functionalities, and/or similar words used herein interchangeably. For example, the external computing device 300 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing device's 300 position in connection with a variety of other systems, including cellular towers, Wi-Fi access points, and/or the like. Similarly, the external computing device 300 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing device 300 may also comprise a user interface (that can comprise a display 316 coupled to a processing element 308) and/or a user input interface (coupled to a processing element 308). For example, the user interface may be a user application, browser, user interface, and/or similar words used herein interchangeably executing on and/or accessible via the external computing device 300 to interact with and/or cause display of information/data from the computing device 200, as described herein. The user input interface can comprise any of a number of devices or interfaces allowing the external computing device 300 to receive data, such as a keypad 318 (hard or soft), a touch display, voice/speech or motion interfaces, or other input device. In embodiments including a keypad 318, the keypad 318 can comprise (or cause display of) the conventional numeric (0-9) and related keys (#, *), and other keys used for operating the external computing device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing device 300. As indicated, this may include a user application that is resident on the entity or accessible through a browser or other user interface for communicating with the computing device 200 and/or various other computing entities.

In another embodiment, the external computing device 300 may include one or more components or functionality that are the same or similar to those of the computing device 200, as described in greater detail above. As will be recognized, these architectures and descriptions are provided for exemplary purposes only and are not limiting to the various embodiments.

Figure 4:
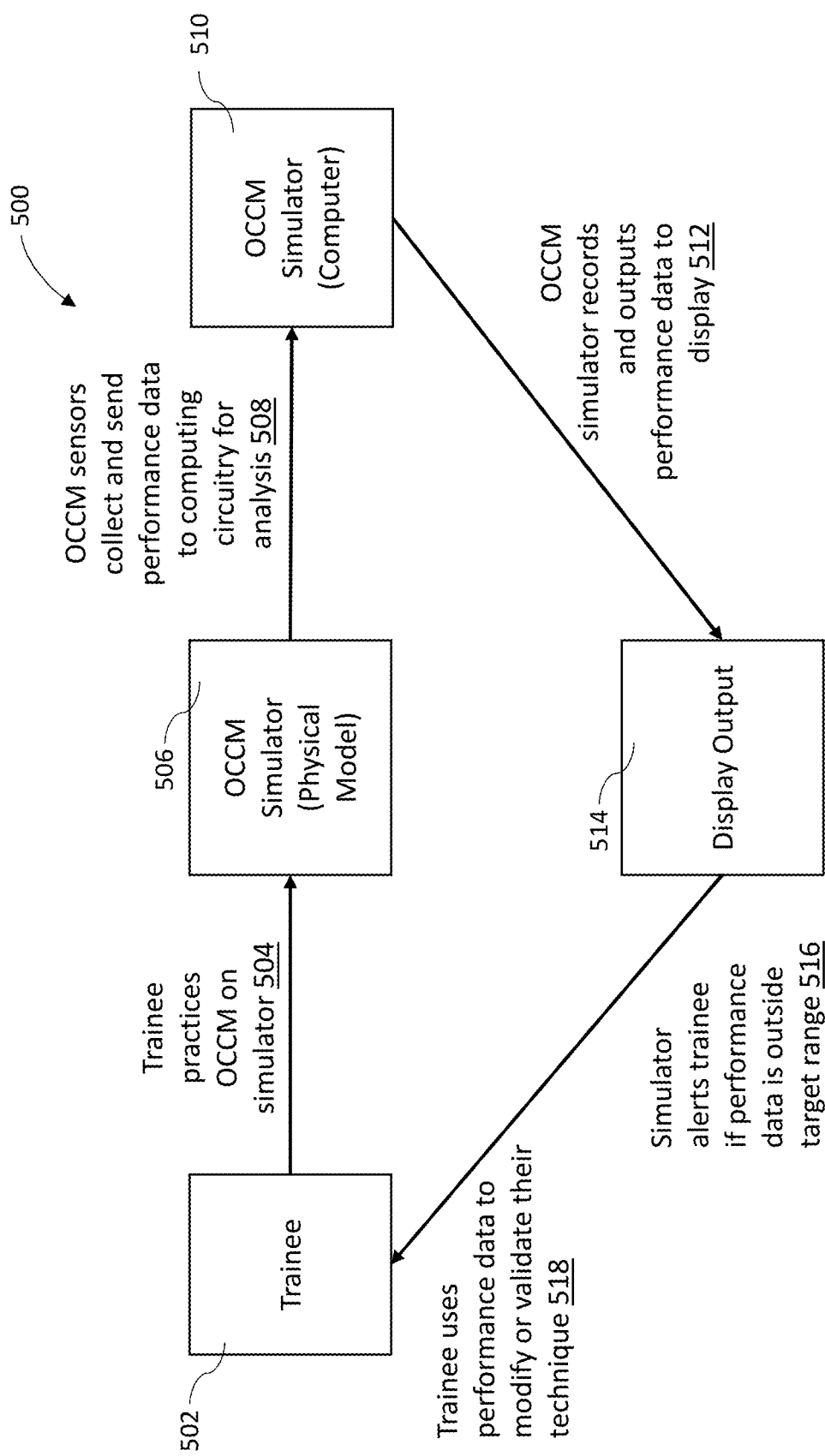
FIG. 4 provides an example process by which a trainee can train on open chest cardiac massage techniques using a task trainer, according to some embodiments described herein.

Referring now to FIG. 4, a process 500 is illustrated for use by a user or trainee of the task trainer to practice open chest cardiac massage techniques. According to some embodiments, the process 500 can comprise a trainee 502 practicing an OCCM technique 504 on an OCCM simulator 506, such as the task trainer 100 or the like. The process 500 can further comprise one or more sensors, e.g., one or more sensors operably coupled to or comprised within the OCCM simulator 506, collecting and sending compression performance data to computing circuitry 510 for analysis 508. The computing circuitry 510 can be separate from or a part of the OCCM simulator 506. In some embodiments, the computing circuitry 510 can analyze, convert, interpret, store, or otherwise manage the performance data 512 and output the performance data, interpreted output data, signals associated with the performance data, signals or code indicative of a command to display the data, or the like on a display 514. In some embodiments, the OCCM simulator or the display 514 can provide an alert to the trainee if performance data is outside of a target performance range 516. In some embodiments, the trainee 502 can then use the performance data to modify or validate their technique 518.

Figure 5:
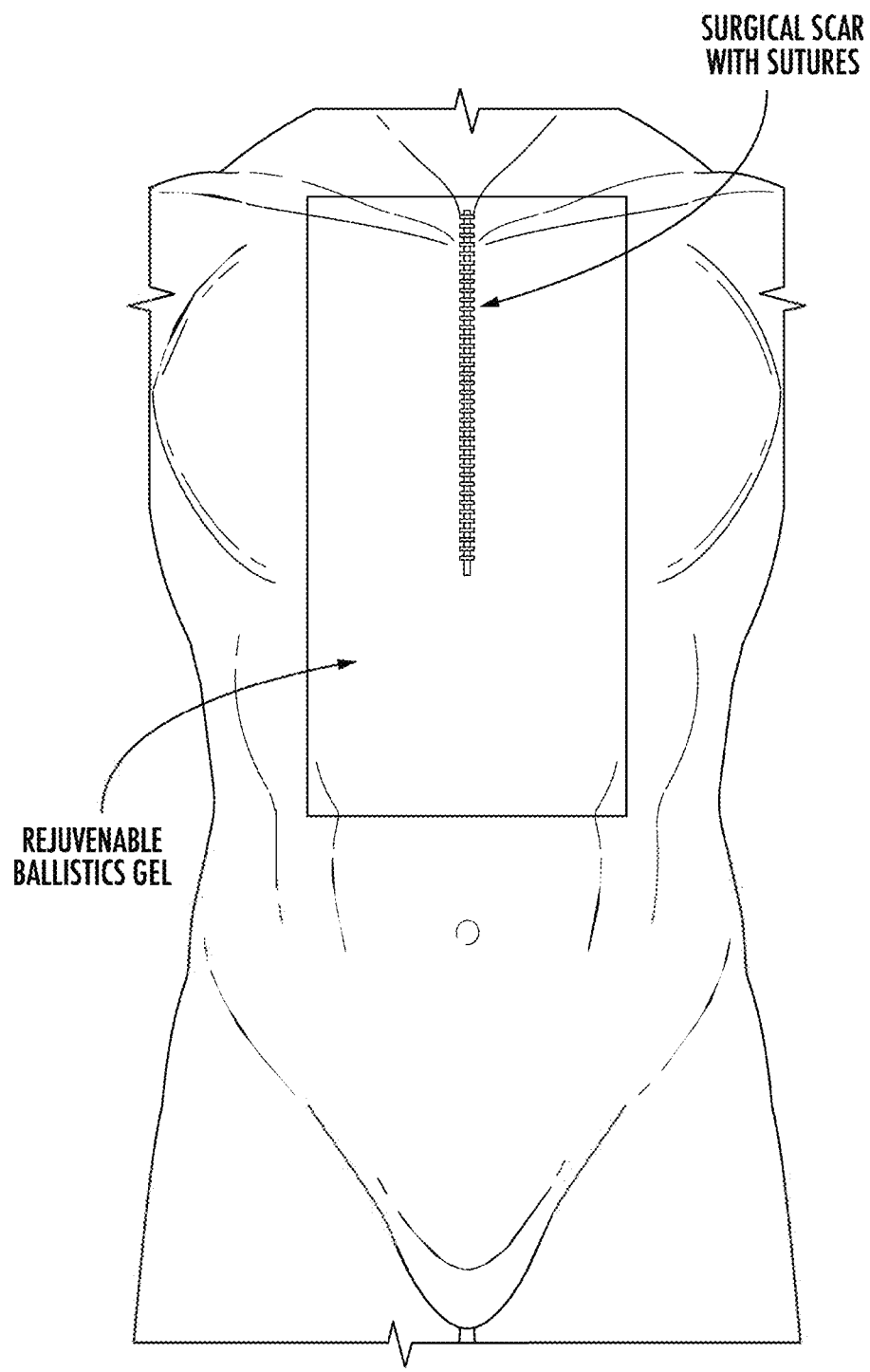
FIG. 5 illustrates an example of an unopened physical model of an OCCM system, at presentation, at the beginning of the cardiac arrest scenario; when a decision is made to proceed to OCCM, the participant will cut through the sutured multilayer and durometer polymer gel at the surgical scar site and dissect down to the surgically wired sternotomy.

FIG. 5 illustrates the unopened physical model of an OCCM system, at presentation, at the beginning of the cardiac arrest scenario. The general position of a sternotomy and the post-surgery sutures present at the start of a cardiac arrest or such cardiac failure that may necessitate open chest cardiac message. In various embodiments of the described task trainer, e.g., task trainer 100, the epidermal layers and/or subcutaneous tissues that rest on the sternum of the patient can be simulated using a suitable material such as a gel, a rejuvenable polymer gel, a semi-solid material, an elastic or elastomeric material, a self-healing material, a thermoplastic material, variants thereof, combinations thereof, and/or the like. In some embodiments, the simulated epidermal layers and/or subcutaneous tissues may be simulated using, at least in part, a ballistics gel. Any material that suitably mimics human skin and subcutaneous tissue with regard to making surgical incisions, suturing, re-entering the chest cavity by cutting through sutures or the like, and/or the spreading of the sternum for increased ease of manual access by the surgeon to the chest cavity is contemplated and is hereby disclosed as part of this disclosure.

Figure 6:
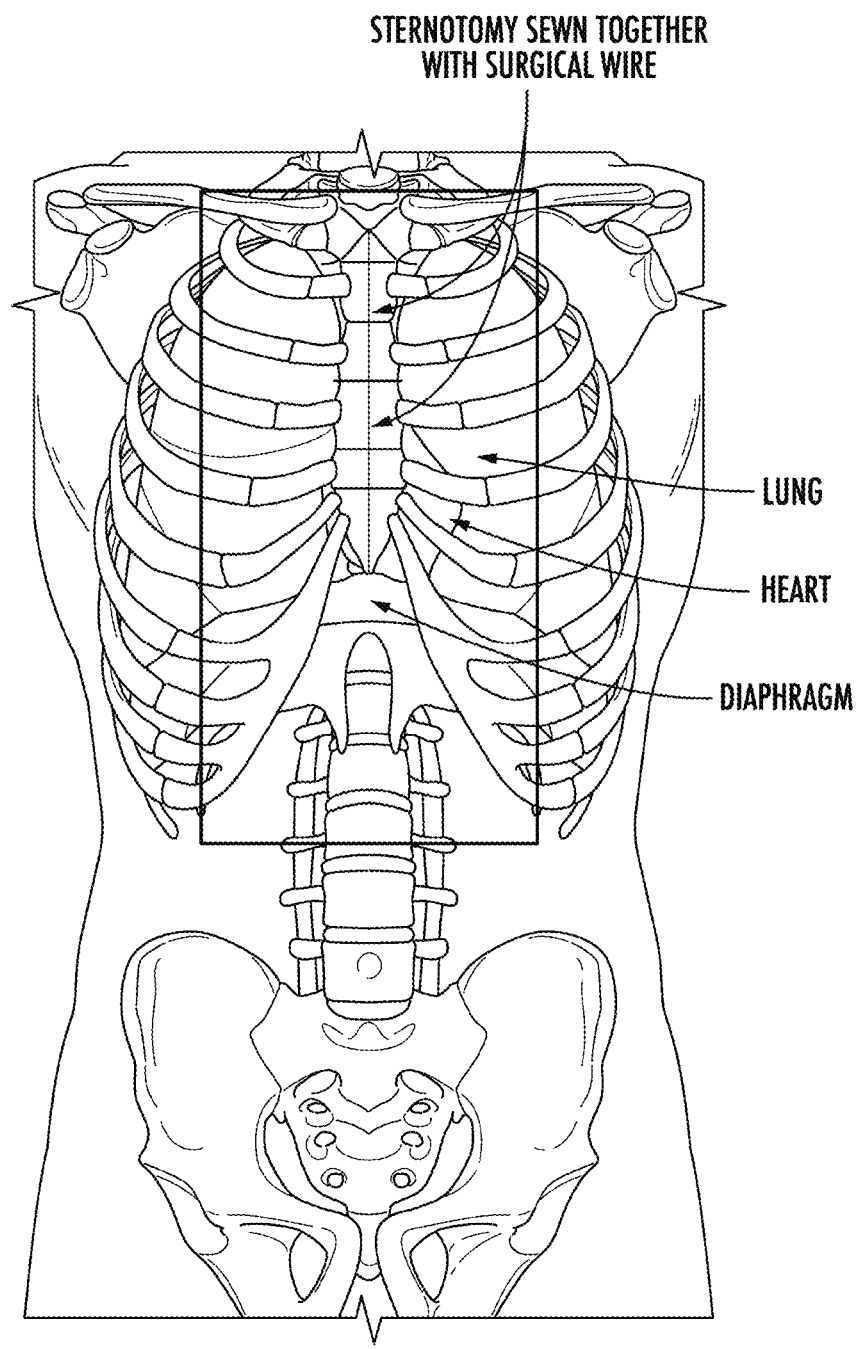
FIG. 6 illustrates some of the anatomical features present within the OCCM simulator with the polymer gel removed; the thoracic cavity shown consists of a ribcage with a wired shut sternotomy, set of lungs, diaphragm and heart, which accurately represents the human chest cavity that must be considered and safely navigated in order to effectively conduct open chest cardiac massage without causing damage to organs, tissues, nerves, arteries, and/or the like within a patient's chest cavity.

FIG. 6 illustrates some of the anatomical features present within the OCCM simulator with the polymer gel removed. The thoracic cavity consists of a ribcage with a wired shut sternotomy, set of lungs, diaphragm and heart. These must be considered and safely navigated in order to effectively conduct open chest cardiac massage without causing damage to organs, tissues, nerves, arteries, and/or the like within a patient's chest cavity. In some embodiments, a task trainer, such as the task trainer 100 or the OCCM model 102, can be dimensioned and configured to accurately reflect the relative positions of the original sternotomy sewn together with surgical wire, the lungs, the heart, the diaphragm, the cervical, thoracic, and lumbar portions of the spine, and/or the like. In some embodiments, a task trainer, such as the OCCM model 102 can comprise one or more coronary vein grafts that are removably disposed within the chest cavity and configured to be ripped out if the trainee fails to properly navigate the chest cavity and locate the heart or if compressions are too forceful. Using such realistic components can provide for more effective training.

Figure 7A:
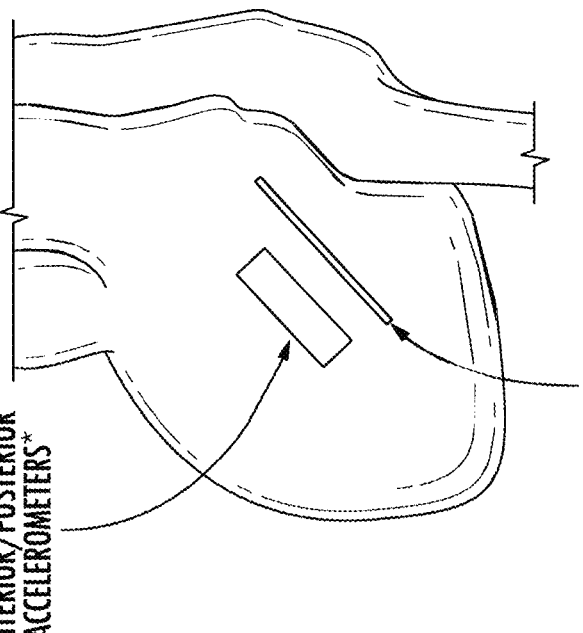
FIGS. 7A and 7B illustrate, respectively, an anterior view and a posterior view of an example molded heart with sensors disposed on an outer surface of the molded heart to monitor the force, positioning, depth, frequency, and effectiveness of compressions on the molded heart when training on open chest cardiac massage techniques using a task trainer comprising the molded heart, according to some embodiments described herein.
Figure 7B:
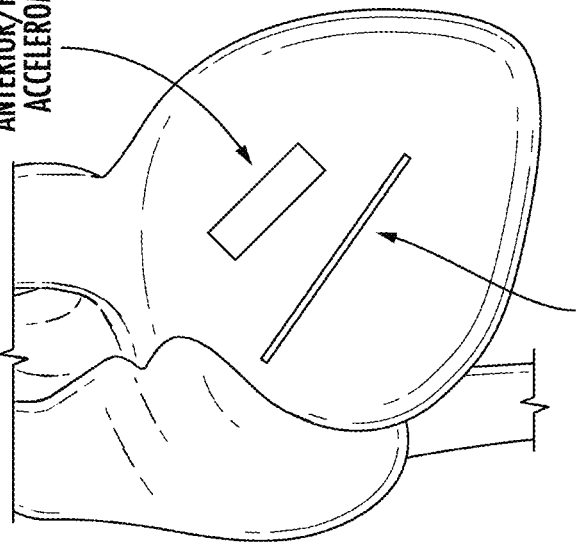

FIGS. 7A and 7B illustrate, respectively, an anterior view and a posterior view of a molded heart for use in an OCCM task trainer, such as the task trainer 100. In some embodiments, the molded heart can include one or more accelerometers disposed on the outside of the molded heart, embedded partially within the molded heart, or disposed completely within the molded heart. In some embodiments, one or more accelerometers can be disposed on or within an anterior surface of the molded heart and one or more accelerometers can be disposed on or within a posterior surface of the molded heart. In some embodiments, each accelerometer can sense movement of the accelerometer, can sense a rate of movement of the accelerometer, can sense the distance of travel of the accelerometer, e.g., from an initial or starting position, and/or the like. In some embodiments, the accelerometer can be operably coupled to or in wired or wireless communication with analysis circuitry or a computing device configured to receive accelerometer data from the accelerometer. In some embodiments, the accelerometer data can be interpreted by the analysis circuitry or computing device in order to interpret various characteristics associated with the open chest cardiac massage during use of the OCCM task trainer by a trainee. For instance, the accelerometer data can be used to interpret the rate, position, direction, frequency, force, and depth of each compression, and provide this data as, for instance, raw data, a moving average of the data, a cumulative average of the data, and/or the like for display to the trainee, e.g., in real-time or near real-time. In some embodiments, such data associated with such characteristics of OCCM effectiveness can be interpreted and displayed to the trainee as a simple indicator, such as a binary indicator, indicating the effectiveness or ineffectiveness of their OCCM technique.

In some embodiments, one or more other sensors can be disposed on or within the molded heart and can comprise one or more of: a flex sensor, a bend sensor, a displacement sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor. In some embodiments, the one or more other sensors, such as a flexing or bending sensor, can be disposed on or within the molded heart to provide data such as that described above to analysis circuitry or a computing device. In some embodiments, a flexing or bending sensor can comprise a resistor for which a change in a resistance value is correlated with a change in the flexure or degree of bending of the sensor. In some embodiments, in a completely unbent state, a bend sensor might return a resistance of about 10-25 KΩ while the bend sensor may increase to greater than about 50 KΩ, about 75 KΩ, or about 100 KΩ in a bent state. A micro-controller or the like (e.g., such as a pullup resistor) or a digital input with the use of a capacitor can be used to determine the rate and degree of flexing or bending, according to some embodiments. In some embodiments, the other sensors can comprise a force sensitive resistor (FSR) that changes its resistance when a force or pressure is applied, e.g., using a conductive film or strip of conductive material having such properties.

In some embodiments, such sensors or FSRs can be disposed on or within the molded heart in order to determine the force applied by the hand or hands of the trainee to the molded heart during OCCM. In addition, the position of the sensors can be carefully chosen so that the lack of force sensed by one of the force/bend sensors, in conjunction with accelerometer travel indicative of a compression, can be used to indicate improper hand placement on or about the molded heart. In that regard, more than one sensor can be applied to the outside of the molded heart in order to determine or map the positioning of the trainee's hand or hands on or about the molded heart during OCCM. By way of example only, two adjacent sub-regions on the anterior surface of the molded heart may be defined, including a first region comprising a first force sensor disposed thereon and a second region comprising a second force sensor disposed thereon. In some embodiments, a portion of the trainee's hand is expected to apply force to the first region when the trainee is properly performing OCCM and no portion of the trainee's hand is expected to apply force to the second region when the trainee is properly performing OCCM. In some embodiments, in an instance in which force is sensed in the first region during an OCCM training session, the analysis circuitry/computing device determines that proper trainee hand placement is being practiced during the OCCM training session. In an instance in which force is sensed in the second region during an OCCM training session, the analysis circuitry/computing device determines that improper trainee hand placement is being practiced during the OCCM training session.

Figure 8:
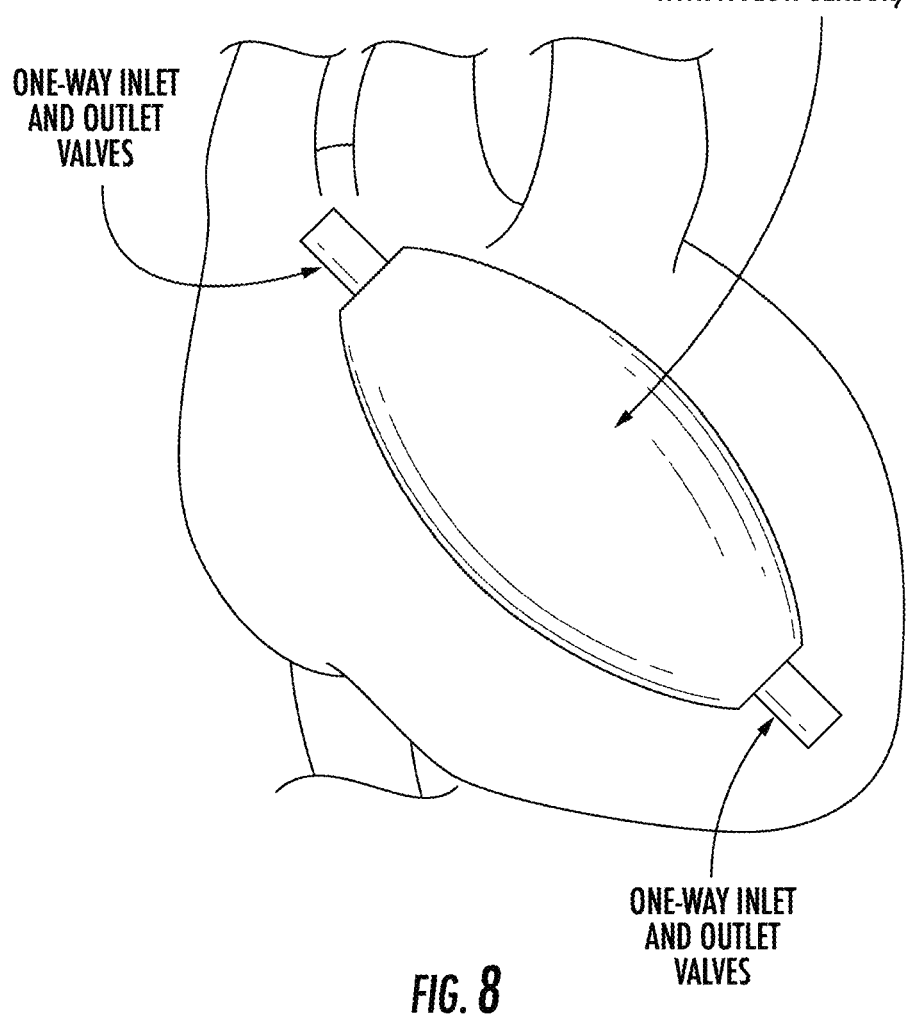
FIG. 8 illustrates an example molded heart comprising a bulb disposed within an inner volume of the molded heart and one or more one-way valves configured to allow for unidirectional flow of a blood-like fluid through the molded heart, according to some embodiments described herein.

Referring now to FIG. 8, an example molded heart is illustrated that defines a bulb within the molded heart having a top opening and a first one-way valve and a bottom opening and a second one-way valve and defining a lumen therethrough. The inner volume of the bulb can be tailored to match an inner-heart volume of a particular simulated patient. In some embodiments, the inner volume of the bulb can be between about 40 mL and about 120 mL, about 45 mL and about 115 mL, about 50 mL and about 110 mL, about 55 mL and about 105 mL, about 60 mL and about 100 mL, about 65 mL and about 95 mL, about 70 mL and about 90 mL, about 75 mL and about 85 mL, or about 80 mL, inclusive of all values and ranges therebetween. In some embodiments, the inner volume of the bulb can be greater than about 40 mL, about 45 mL, 50 mL, about 55 mL, about 60 mL, about 65 mL, about 70 mL, about 75 mL, about 80 mL, about 85 mL, about 90 mL, about 95 mL, about 100 mL, about 105 mL, about 110 mL, about 115 mL, or about 120 mL, inclusive of all values and ranges therebetween. In some embodiments, the inner volume of the bulb can be less than about 120 mL, about 115 mL, about 110 mL, about 105 mL, about 100 mL, about 95 mL, about 90 mL, about 85 mL, about 80 mL, about 75 mL, about 70 mL, about 65 mL, about 60 mL, about 55 mL, about 50 mL, about 45 mL, and about 40 mL, inclusive of all values and ranges therebetween. In some embodiments, the lumen through the molded heart can be in fluid communication with one or more of a flow sensor and/or a flow meter, a scale, and/or the like. Based on the output data from the flow sensor, flow meter, and/or scale, the accelerometers, the flex sensors, the bend sensors, the force sensors, the displacement sensors, and/or the like, the analysis circuitry and/or computing device can determine one or more characteristics of the OCCM, such as compression depth, average compression, cardiac output, stroke volume, compression rate, force on right heart, hand positioning correctness, and/or the like. This and other suitable characteristics of the OCCM can, after being analyzed, can be transmitted for presentation to the trainee on a display, e.g., as part of an interactive display, an infographic, a dashboard, or the like.

Figure 9:
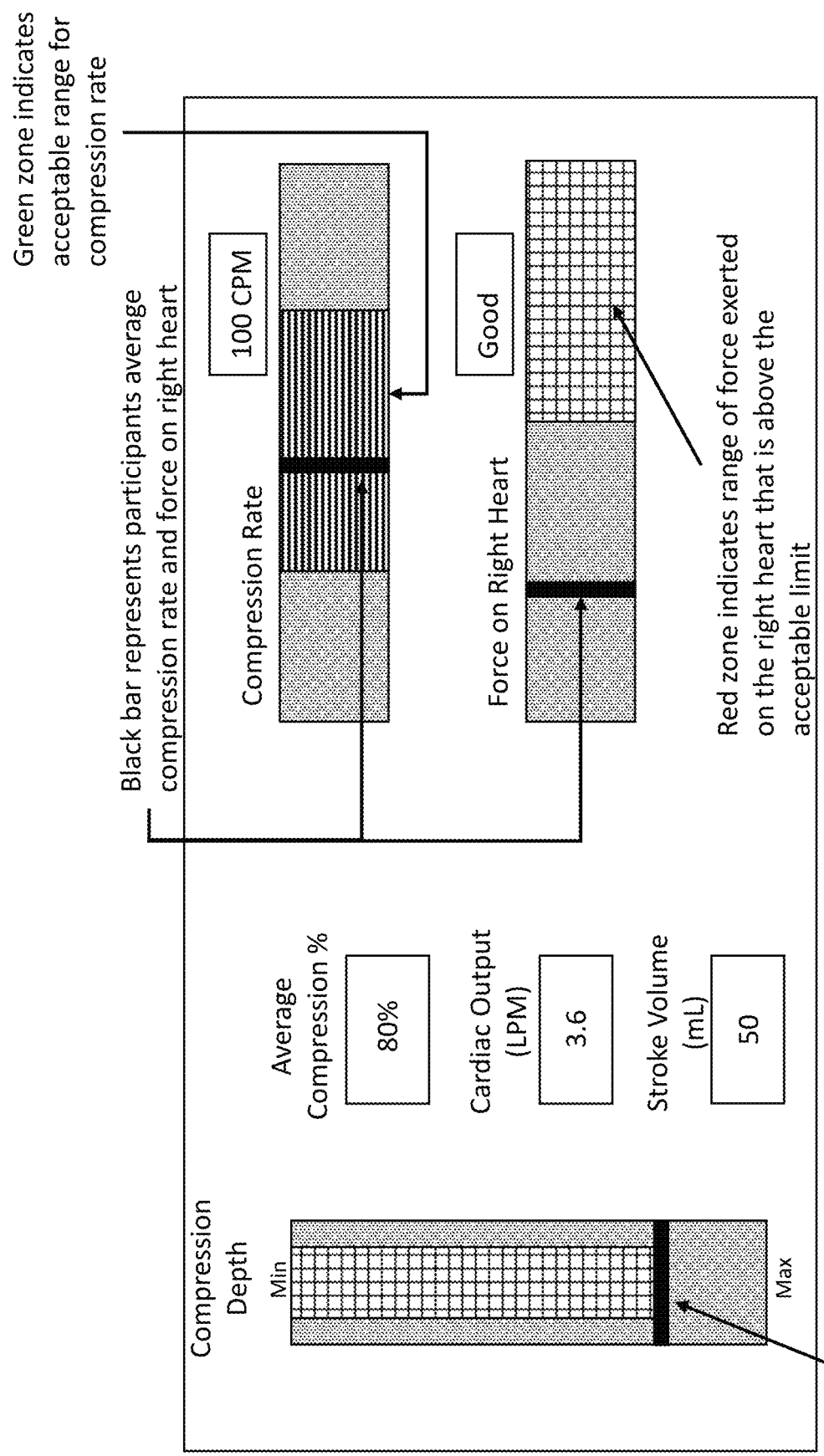
FIG. 9 illustrates an example dashboard for presentation to a trainee on a display during or after use of a task trainer by the trainee, according to some embodiments described herein.

Referring now to FIG. 9, an example of a dashboard for presenting, for instance, real-time or near real-time characteristics and metrics associated with OCCM effectiveness, is illustrated. A display, e.g., the display 316, can be used to present one or more metrics or a current indicator value for characteristics such as compression depth, average compression, cardiac output, stroke volume, compression rate, force on right heart, hand positioning correctness, and/or the like. In some embodiments, graphical representations and/or textual representations of these or other characteristics can also or alternatively be presented. For instance, in some embodiments, one or more bar graphs can be used to present compression depth as a range of compression depth through the average or last or moving average of compression cycles. Said otherwise, on a graph that illustrates a minimum compression depth of 0% when the molded heart is completely uncompressed and a maximum compression depth as 100% compression, an average compression depth, moving average compression depth, real-time compression depth, and/or the like value can be presented in graphical form instead of or in addition to presenting the value in textual or numerical form. Likewise, coloration of graphs or portions of graphs can be used to illustrate whether a particular aspect of the OCCM technique is in compliance or out of compliance with best practices. For instance, a bar graph can be used to plot the real-time, average, moving average, maximum, median, or other statistic about the force exerted on the right heart during OCCM. In the bar graph of force on the right heart, a first portion can have a green color while a second portion can have a red color, the current status of the statistic being illustrated using any suitable symbol and being either within the green portion or the red portion of the graph where the green portion is indicative of a range of forces on the right heart that are acceptable while the red portion is indicative of a range of forces on the right heart that are unacceptable.

Figure 10A:
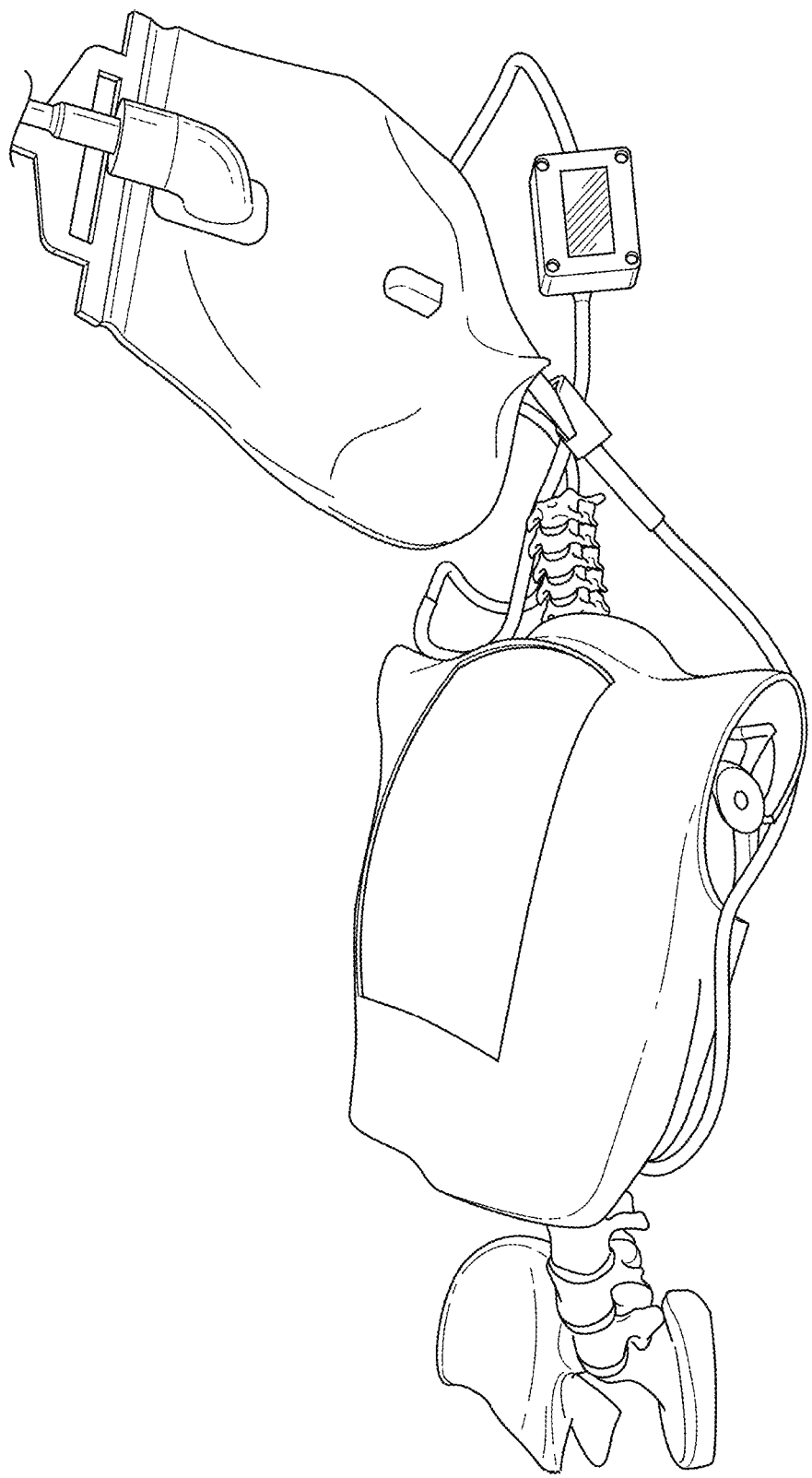
FIG. 10A is a picture of an example task trainer before beginning a training, according to some embodiments described herein.
Figure 10B:
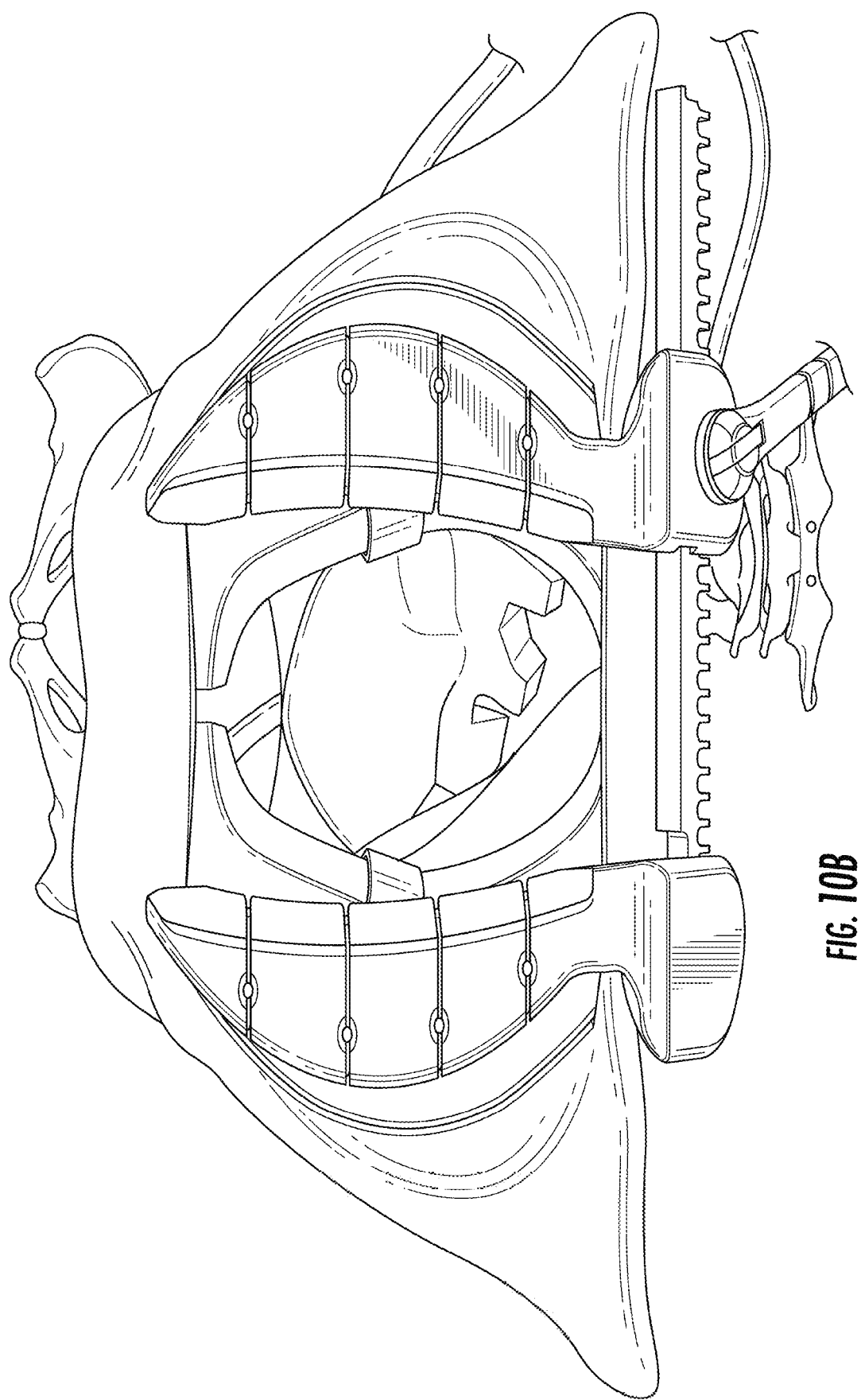
FIG. 10B is a picture of the example task trainer from FIG. 10A during use by a trainee after the epidermis, subcutaneous tissue, and sternum have been cut along the suture line to gain entry to the chest cavity, and after a sternum retractor/spreader has been used to increase the area of the opening into the chest cavity to allow the trainee to conduct open chest cardiac massage, according to some embodiments described herein.

Referring now to FIGS. 10A and 10B, images of an example OCCM task trainer system are provided that demonstrate some of the components of such a system. In particular, FIG. 10A is a picture of the example task trainer before beginning a training. In FIG. 10A, the task trainer comprises a simulated chest cavity mounted on a section of a spinal column and including a sacrificial skin-like material disposed across a top portion of the task trainer and configured to be surgically cut in order to access the sternum for retraction and access to an interior of the chest cavity. As illustrated, the task trainer further comprises a fluid inlet point and a fluid outlet point. As illustrated, the task trainer system further comprises one or more fluid reservoirs and suitable tubing in fluidic communication with the fluid inlet and outlet points of the task trainer such that fluid can be communicated from or to the reservoir, through the tubing, in through the inlet point of the task trainer, out through the outlet point of the task trainer and past a flow sensor and/or a flow meter solely based on manual compressions by the trainee during OCCM.

FIG. 10B is a picture of the example task trainer from FIG. 10A during use by a trainee after the simulated skin, subcutaneous tissue, and sternum have been surgically cut to gain entry to the chest cavity, and after a sternum retractor/spreader has been used to increase the area of the opening into the chest cavity to allow the trainee to conduct OCCM. As illustrated, the sternum retractor/spreader is able to help the trainee visualize the chest cavity and provide an aperture into the chest cavity that has a sufficient diameter for the trainee to insert one or more of their hands into the chest cavity to perform OCCM on the molded heart.

As illustrated, the molded heart is immediately visible through the aperture in the thorax without simulations or representations of the lungs, diaphragm, liver, and/or the like being present in order to help a trainee navigate and find the molded heart. In some embodiments, during OCCM training using the task trainer, a visual impediment can be included above the aperture to the chest cavity after the trainee makes their cuts through the epidermis and subcutaneous tissue, and separates the sternum, and before the trainee inserts their hands into the chest cavity to simulate the lack of visibility that medical professionals such as surgeons might experience during OCCM with a living patient due to blood and/or the presence of other organs such as the lungs, diaphragm, liver, etc.

In some embodiments, the illustrated task trainer can include such other organs to increase the difficulty for a trainee of finding the heart and properly performing OCCM. During OCCM on a living patient, a medical professional often faces limited visibility and must rely on feeling landmarks within the chest cavity to orient themselves and navigate properly to the patient's heart. By initially including only the molded heart in the task trainer and then later adding the other organs and/or limiting the trainee's visibility of the chest cavity, the trainee can gain valuable practice in manually navigating through a patient's chest cavity and finding the heart using only these landmarks.

Figure 11:
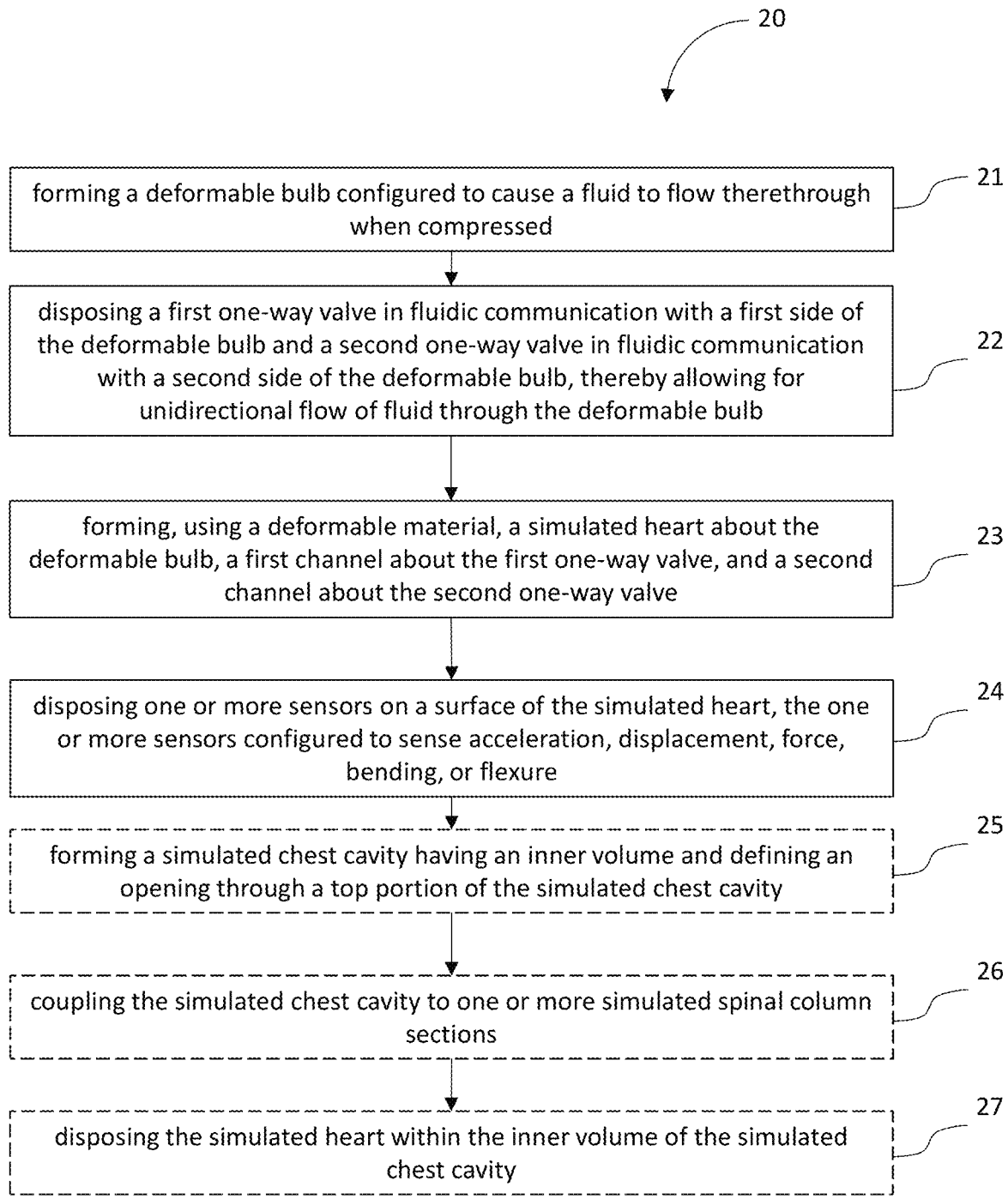
FIG. 11 provides a process flow diagram of an example method for manufacturing an open chest cardiac massage task trainer, according to some embodiments discussed herein.

Referring now to FIG. 11, a method 20 is illustrated that comprises forming a deformable bulb configured to cause a fluid to flow therethrough when compressed, at 21. The method 20 can further comprise disposing a first one-way valve in the first channel and a second one-way valve in the second channel to allow for unidirectional flow of fluid through the first and second channels and the deformable bulb, at 22. The method 20 can further comprise forming a molded heart, about the deformable bulb, from a deformable material, the molded heart defining a first channel through a first side of the molded heart and a second channel through a second side of the molded heart, the first and second channels being in fluidic communication with the deformable bulb, at 23. The method 20 can further comprise disposing one or more sensors on a surface of the molded heart, the one or more sensors configured to sense acceleration, displacement, force, bending, or flexure, at 24. The method 20 can, optionally, further comprise forming a simulated chest cavity having an inner volume and defining an opening through a top portion of the simulated chest cavity, at 25. The method 20 can, optionally, further comprise coupling the simulated chest cavity to one or more molded spinal column sections, at 26. The method 20 can, optionally, further comprise disposing the molded heart within the inner volume of the simulated chest cavity, at 27. Some or all elements of the method 20 can be carried out or caused to be carried out by circuitry, such as the computing device 200, the external computing device 300, or the like.

Figure 12:
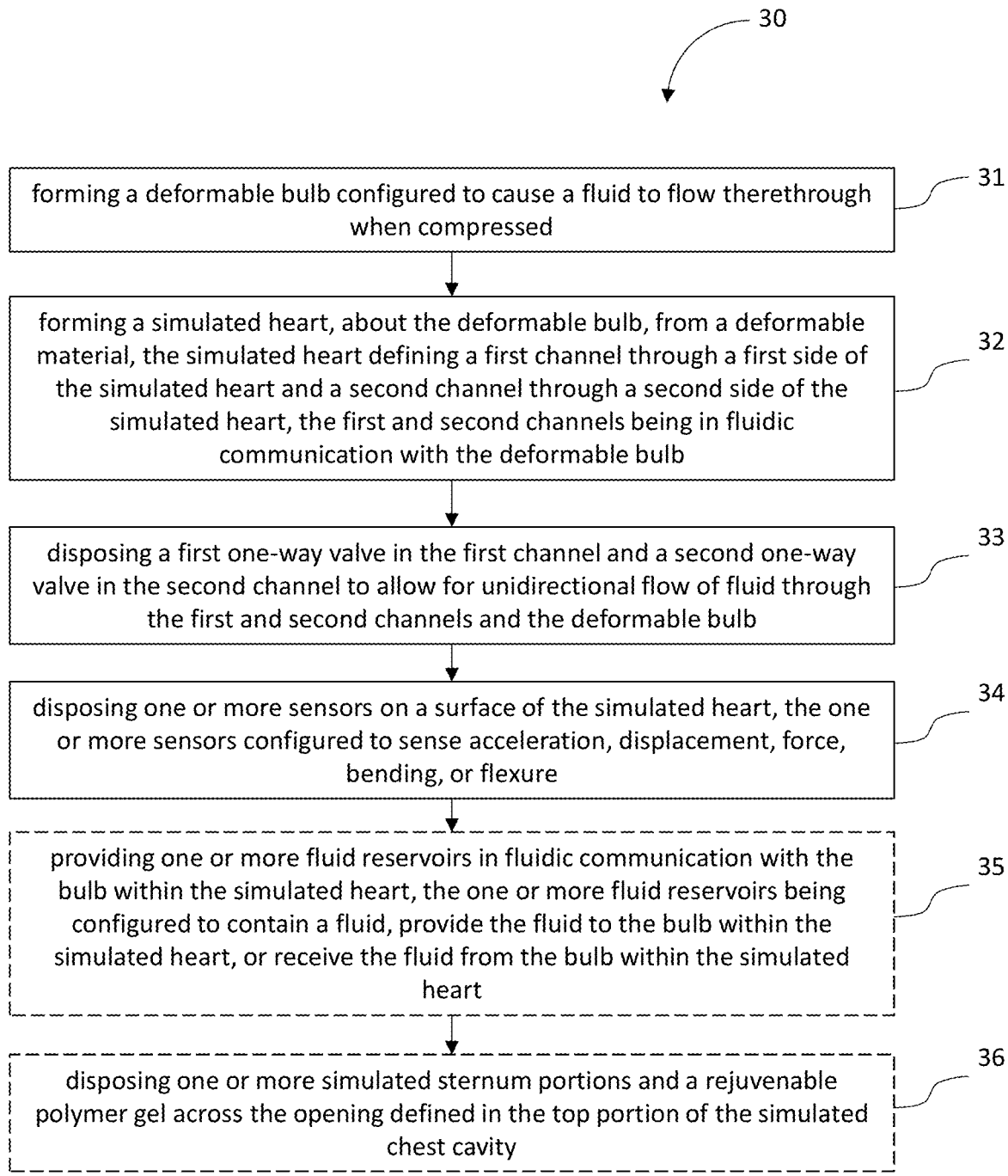
FIG. 12 provides a process flow diagram of an example method for manufacturing an open chest cardiac massage task trainer, according to some embodiments discussed herein.

Referring now to FIG. 12, a method 30 is illustrated that comprises forming a deformable bulb configured to cause a fluid to flow therethrough when compressed, at 31. The method 30 can further comprise forming a molded heart, about the deformable bulb, from a deformable material, the molded heart defining a first channel through a first side of the molded heart and a second channel through a second side of the molded heart, the first and second channels being in fluidic communication with the deformable bulb, at 32. The method 30 can further comprise disposing a first one-way valve in the first channel and a second one-way valve in the second channel to allow for unidirectional flow of fluid through the first and second channels and the deformable bulb, at 33. The method 30 can further comprise disposing one or more sensors on a surface of the molded heart, the one or more sensors configured to sense acceleration, displacement, force, bending, or flexure, at 34. The method 30 can, optionally, further comprise providing one or more fluid reservoirs in fluidic communication with the bulb within the molded heart, the one or more fluid reservoirs being configured to contain a fluid, provide the fluid to the bulb within the molded heart, or receive the fluid from the bulb within the molded heart, at 35. The method 30 can, optionally, further comprise disposing one or more molded sternum portions and a rejuvenable polymer gel across the opening defined in the top portion of the simulated chest cavity, at 36. Some or all elements of the method 30 can be carried out or caused to be carried out by circuitry, such as the computing device 200, the external computing device 300, or the like.

Figure 13:
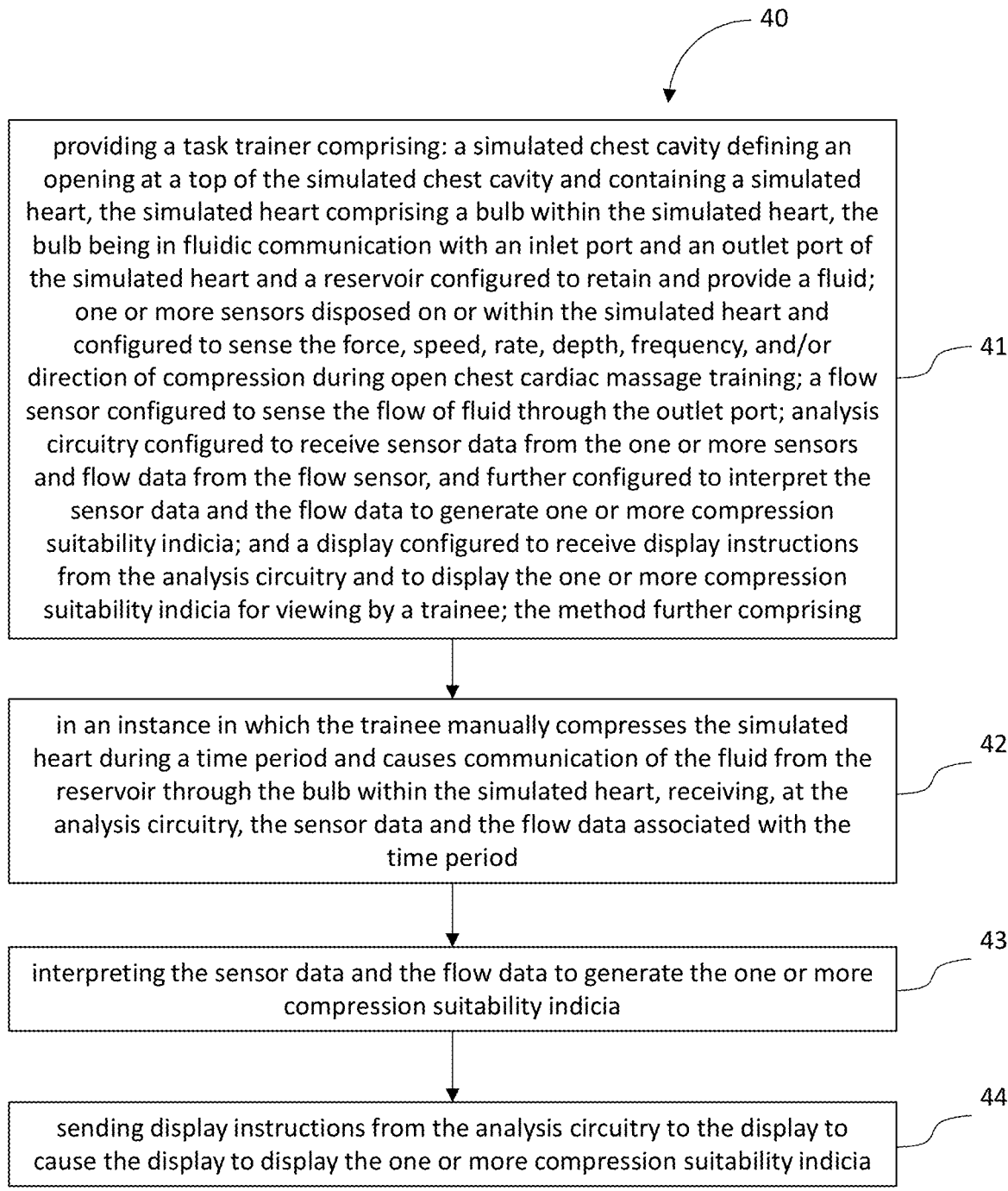
FIG. 13 provides a process flow diagram of an example method for using an open chest cardiac massage task trainer, according to some embodiments discussed herein.

Referring now to FIG. 13, a method 40 is illustrated that comprises providing a task trainer comprising: a simulated chest cavity defining an opening at a top of the simulated chest cavity and containing a molded heart, the molded heart comprising a bulb within the molded heart, the bulb being in fluidic communication with an inlet port and an outlet port of the molded heart and a reservoir configured to retain and provide a fluid; one or more sensors disposed on or within the molded heart and configured to sense the force, speed, rate, depth, frequency, and/or direction of compression during open chest cardiac massage training; a flow sensor configured to sense the flow of fluid through the outlet port; analysis circuitry configured to receive sensor data from the one or more sensors and flow data from the flow sensor, and further configured to interpret the sensor data and the flow data to generate one or more compression suitability indicia; and a display configured to receive display instructions from the analysis circuitry and to display the one or more compression suitability indicia for viewing by a trainee, at 41. The method 40 can further comprise, in an instance in which the trainee manually compresses the molded heart during a time period and causes communication of the fluid from the reservoir through the bulb within the molded heart, receiving, at the analysis circuitry, the sensor data and the flow data associated with the time period, at 42. The method 40 can further comprise interpreting the sensor data and the flow data to generate the one or more compression suitability indicia, at 43. The method 40 can, optionally, further comprise sending display instructions from the analysis circuitry to the display to cause the display to display the one or more compression suitability indicia, at 44. Some or all elements of the method 40 can be carried out or caused to be carried out by circuitry, such as the computing device 200, the external computing device 300, or the like.

Figure 14:
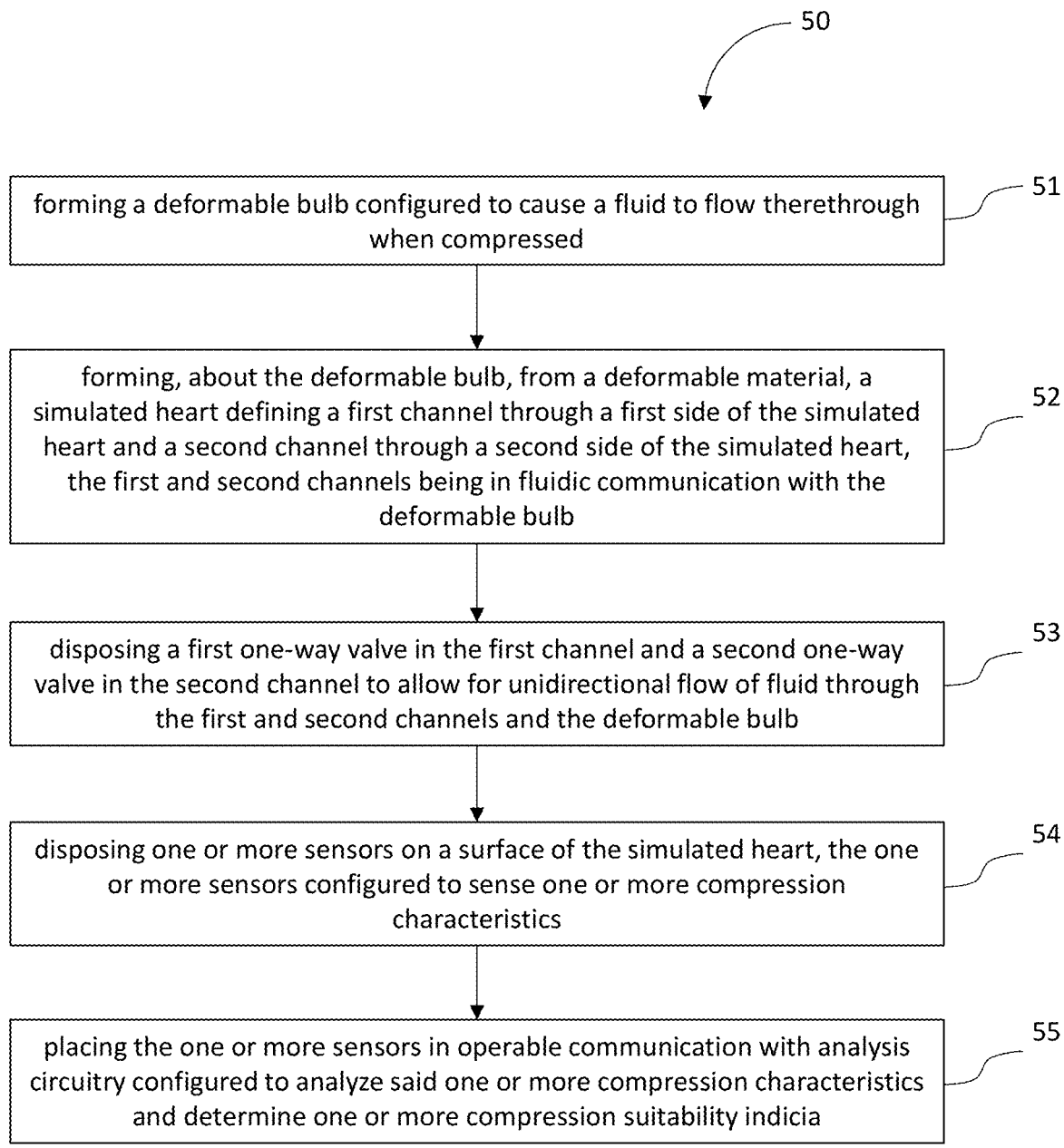
FIG. 14 provides a process flow diagram of an example method for forming an open chest cardiac massage task trainer, according to some embodiments discussed herein.

Referring now to FIG. 14, a method 50 is illustrated that comprises forming a deformable bulb configured to cause a fluid to flow therethrough when compressed, at 51. The method 50 can further comprise forming, about the deformable bulb, from a deformable material, a simulated heart defining a first channel through a first side of the simulated heart and a second channel through a second side of the simulated heart, the first and second channels being in fluidic communication with the deformable bulb, at 52. The method 50 can further comprise disposing a first one-way valve in the first channel and a second one-way valve in the second channel to allow for unidirectional flow of fluid through the first and second channels and the deformable bulb, at 53. The method 50 can further comprise disposing one or more sensors on a surface of the simulated heart, the one or more sensors configured to sense one or more compression characteristics, at 54. The method 50 can further comprise placing the one or more sensors in operable communication with analysis circuitry configured to analyze said one or more compression characteristics and determine one or more compression suitability indicia, at 55. Some or all elements of the method 50 can be carried out or caused to be carried out by circuitry, such as the computing device 200, the external computing device 300, or the like.

Figure 15:
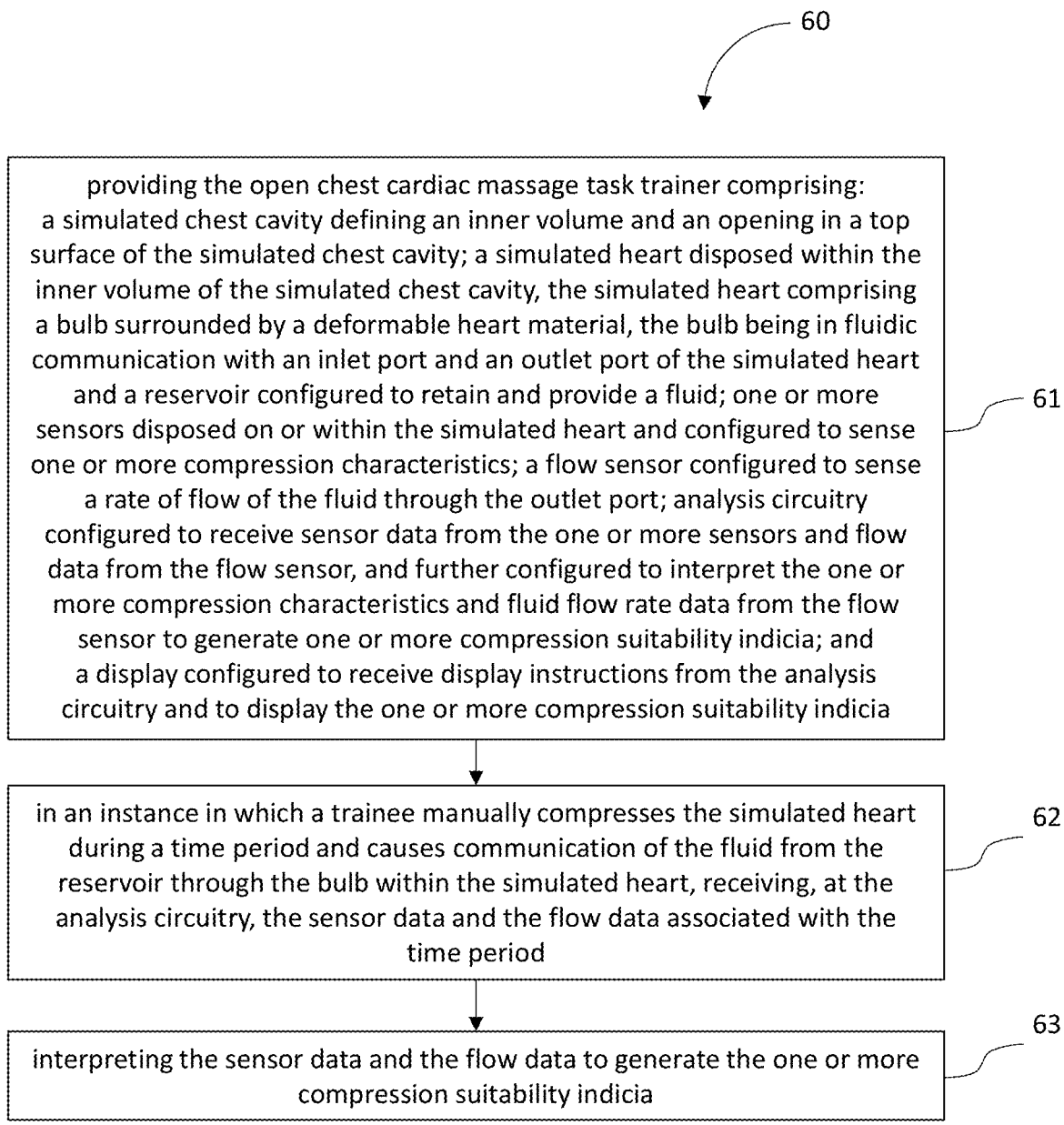
FIG. 15 provides a process flow diagram of an example method for using an open chest cardiac massage task trainer, according to some embodiments discussed herein.

Referring now to FIG. 15, a method 60 is illustrated that comprises providing the open chest cardiac massage task trainer comprising: a simulated chest cavity defining an inner volume and an opening in a top surface of the simulated chest cavity; a simulated heart disposed within the inner volume of the simulated chest cavity, the simulated heart comprising a bulb surrounded by a deformable heart material, the bulb being in fluidic communication with an inlet port and an outlet port of the simulated heart and a reservoir configured to retain and provide a fluid; one or more sensors disposed on or within the simulated heart and configured to sense one or more compression characteristics; a flow sensor configured to sense a rate of flow of the fluid through the outlet port; analysis circuitry configured to receive sensor data from the one or more sensors and flow data from the flow sensor, and further configured to interpret the one or more compression characteristics and fluid flow rate data from the flow sensor to generate one or more compression suitability indicia; and a display configured to receive display instructions from the analysis circuitry and to display the one or more compression suitability indicia, at 61. The method 60 can further comprise, in an instance in which a trainee manually compresses the simulated heart during a time period and causes communication of the fluid from the reservoir through the bulb within the simulated heart, receiving, at the analysis circuitry, the sensor data and the flow data associated with the time period, at 62. The method 60 can further comprise interpreting the sensor data and the flow data to generate the one or more compression suitability indicia, at 63. The method 60 can, optionally, further comprise sending display instructions from the analysis circuitry to the display to cause the display to display the one or more compression suitability indicia. Some or all elements of the method 60 can be carried out or caused to be carried out by circuitry, such as the computing device 200, the external computing device 300, or the like.

Described is an open chest cardiac massage (OCCM) task trainer. The OCCM task trainer includes a simulated chest cavity comprising of a rib cage, lungs, diaphragm and heart. The simulated heart having a form factor, feel, dimensions, mechanical properties, deformability, and other characteristics that are substantially equivalent to a human heart. The OCCM task trainer includes componentry for structural support of other components and for facilitating navigation of the chest cavity by a trainee prior to simulating OCCM. The OCCM task trainer includes a simulated skin and sternum configured to be surgically separated and reformed for repeated anterior access to the chest cavity. The task trainer includes one or more sensors placed on, about, and/or within the simulated heart in order to determine the effectiveness of OCCM as simulated by a trainee. Computing circuitry and methods are described for providing real-time feedback to a trainee about the effectiveness of simulated OCCM relative to best practices for OCCM procedures.

In some embodiments, an open chest cardiac massage task trainer can be provided that comprises a simulated chest cavity defining an opening at a top of the simulated chest cavity comprising of a rib cage, lungs, diaphragm and containing a molded heart, the molded heart comprising a bulb within the molded heart, the bulb being in fluidic communication with an inlet port and an outlet port of the molded heart; one or more sensors disposed on or within the molded heart and configured to sense the force, speed, rate, depth, frequency, and/or direction of compression during open chest cardiac massage training; analysis circuitry configured to receive sensor data from the one or more sensors and interpret the sensor data to generate one or more compression characteristics. In some embodiments, the open chest cardiac massage task trainer can further comprise sternum portions disposed above the simulated chest cavity; and a rejuvenable polymer gel disposed over the sternum portions to simulate epidermis and subcutaneous tissue, the rejuvenable polymer gel being configured to be surgically cut to gain access to the surgically wired sternum portions disposed above the simulated chest cavity. In some embodiments, the open chest cardiac massage task trainer can further comprise one or more fluid reservoirs configured to contain or receive a fluid, each of the one or more fluid reservoirs being in fluidic communication with the inlet port or the outlet port of the molded heart; and a flow sensor and/or a flow meter in fluidic communication with the outlet port of the molded heart and configured to measure the flow rate and volume of fluid flowing through the outlet port of the molded heart, wherein the analysis circuitry is further configured to receive flow rate and volume data from the flow sensor and/or flow meter. In some embodiments, the open chest cardiac massage task trainer can further comprise a display configured to receive, from the analysis circuitry, the one or more compression characteristics and to display the one or more compression characteristics. In some embodiments, at least one of the one or more sensors can comprise an accelerometer. In some embodiments, at least one of the one or more sensors comprises one or more of: a displacement sensor, a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

In some embodiments, a method can be carried out that comprises: forming a deformable bulb configured to cause a fluid to flow therethrough when compressed; forming a molded heart, about the deformable bulb, from a deformable material, the molded heart defining a first channel through a first side of the molded heart and a second channel through a second side of the molded heart, the first and second channels being in fluidic communication with the deformable bulb; disposing a first one-way valve in the first channel and a second one-way valve in the second channel to allow for unidirectional flow of fluid through the first and second channels and the deformable bulb; and disposing one or more sensors on a surface of the molded heart, the one or more sensors configured to sense acceleration, force, bending, or flexure. In some embodiments, the method can further comprise forming a simulated chest cavity having an inner volume and defining an opening through a top portion of the simulated chest cavity; coupling the simulated chest cavity to one or more molded spinal column sections; and disposing the molded heart within the inner volume of the simulated chest cavity. In some embodiments, the method can further comprise providing one or more fluid reservoirs in fluidic communication with the bulb within the molded heart, the one or more fluid reservoirs being configured to contain a fluid, provide the fluid to the bulb within the molded heart, or receive the fluid from the bulb within the molded heart. In some embodiments, the method can further comprise disposing one or more molded sternum portions and a multilayer and durometer rejuvenable polymer gel across the opening defined in the top portion of the simulated chest cavity. As used herein, "durometer" refers to materials, such as rubbers, elastomers, polymers, plastics, gels, or the like, that have a hardness and therefore resist indentation or plastic deformation in response to a deforming force. As used herein, "rejuvenable" refers to a characteristic of a material to be able to be restored to an earlier or an original shape, form factor, dimensions, and/or mechanical properties. By way of example only, the rejuvenable polymer gel may be operable to be cut during use of the task trainer to access the opening into the chest cavity, and after use of the task trainer, the rejuvenable polymer gel may be thermally, chemically, and/or physically manipulated in order to re-form the uncut polymer gel for re-use as part of the task trainer.

In some embodiments, a method can be carried out that comprises providing a task trainer comprising: a simulated chest cavity defining an opening at a top of the simulated chest cavity and containing a rib cage, lungs, diaphragm and a molded heart, the molded heart comprising a bulb within the molded heart, the bulb being in fluidic communication with an inlet port and an outlet port of the molded heart and a reservoir configured to retain and provide a fluid; one or more sensors disposed on or within the molded heart and configured to sense the force, speed, rate, depth, frequency, and/or direction of compression during open chest cardiac massage training; a flow sensor configured to sense the flow of fluid through the outlet port; analysis circuitry configured to receive sensor data from the one or more sensors and flow data from the flow sensor, and further configured to interpret the sensor data and the flow data to generate one or more compression suitability indicia; and a display configured to receive display instructions from the analysis circuitry and to display the one or more compression suitability indicia for viewing by a trainee; the method further comprising: in an instance in which the trainee manually compresses the molded heart during a time period and causes communication of the fluid from the reservoir through the bulb within the molded heart, receiving, at the analysis circuitry, the sensor data and the flow data associated with the time period; interpreting the sensor data and the flow data to generate the one or more compression suitability indicia; and sending display instructions from the analysis circuitry to the display to cause the display to display the one or more compression suitability indicia.

In some embodiments, an apparatus can be provided that comprises a deformable bulb defining an inner volume, the bulb further defining a first opening on a first side of the bulb and a second opening on a second side of the bulb; a first one-way valve in fluidic communication with the first opening of the bulb and a second one-way valve in fluidic communication with the second opening the bulb; a deformable material disposed about the bulb to form a molded heart, the deformable material also forming a first channel into which at least part of the first one-way valve is disposed and a second channel into which at least part of the second one-way valve is disposed, wherein the molded heart is dimensioned and configured to simulate a human heart; and one or more sensors disposed on or within the molded heart and configured to sense at least one of: a compression force, a compression speed, a compression rate, a compression depth, a compression frequency, a compression direction, a compression volume output, finger placement, or palm placement during open chest cardiac massage training. In some embodiments, the apparatus can further comprise analysis circuitry configured to receive sensor data from the one or more sensors and interpret the sensor data to generate one or more compression characteristics. In some embodiments, the apparatus can further comprise a simulated chest cavity defining an opening at a top of the simulated chest cavity and an inner volume configured to retain a rib cage, lungs, a diaphragm, and the molded heart. In some embodiments, the apparatus can further comprise sternum portions disposed above the simulated chest cavity and substantially over or within said opening; and a multilayer and durometer rejuvenable polymer gel disposed over the sternum portions to simulate skin and subcutaneous tissue, the rejuvenable polymer gel being configured to be surgically cut to gain access to the sternum portions disposed above the simulated chest cavity. In some embodiments, the apparatus can further comprise one or more fluid reservoirs configured to contain or receive a fluid, each of the one or more fluid reservoirs being in fluidic communication with the inlet port or the outlet port of the molded heart; a flow sensor in fluidic communication with the outlet port of the molded heart and configured to measure the flow rate and volume of fluid flowing through the outlet port of the molded heart, wherein the analysis circuitry is further configured to receive flow rate data from the flow sensor; and a display configured to receive, from the analysis circuitry, the one or more compression characteristics and to display the one or more compression characteristics. In some embodiments, at least one of the one or more sensors comprises one or more of: an accelerometer, a flex sensor, a bend sensor, a force sensor, a force transducer, a pressure sensor, a pressure transducer, a load sensor, a hydraulic force sensor, a displacement sensor, a pneumatic force sensor, a piezoelectric force sensor, a capacitive force sensor, or a force sensitive resistor.

According to another embodiment, an open chest cardiac massage (OCCM) task trainer can be provided that comprises a simulated chest cavity defining an inner volume and an opening in a top surface of the simulated chest cavity; a simulated heart disposed within the inner volume of the simulated chest cavity, the simulated heart comprising a bulb surrounded by a deformable heart material, the bulb being in fluidic communication with an inlet port and an outlet port of the simulated heart; one or more sensors disposed on or within the simulated heart and configured to sense one or more compression characteristics during a simulated open chest cardiac massage procedure; and analysis circuitry in operable communication with the one or more sensors, the analysis circuitry configured to determine, from the one or more compression characteristics, one or more compression suitability indicia.

In some embodiments, the one or more compression characteristics can comprise at least one of: a force of compression, a speed of compression, a rate of compression, a depth of compression, a frequency of compression, an angle of compression, a compression direction, a compression volume output, a trainee's finger placement during the simulated open chest cardiac massage procedure, or a trainee's palm placement during the simulated open chest cardiac massage procedure.

In some embodiments, the OCCM task trainer can comprise one or more sternum portions disposed above the simulated chest cavity. In some embodiments, the OCCM task trainer can comprise a multilayer and durometer rejuvenable polymer gel disposed over the sternum portions to simulate skin and subcutaneous tissue, the multilayer and durometer rejuvenable polymer gel being configured to be surgically cut to gain access to the sternum portions disposed above the simulated chest cavity. In some embodiments, the OCCM task trainer can comprise one or more fluid reservoirs configured to contain or receive a fluid, each of the one or more fluid reservoirs being in fluidic communication with the inlet port or the outlet port of the simulated heart. In some embodiments, the OCCM task trainer can comprise a flow sensor in fluidic communication with the outlet port of the simulated heart and configured to measure the flow rate and volume of fluid flowing through the outlet port of the simulated heart. In some embodiments, the analysis circuitry can be further configured to receive flow rate data from the flow sensor.

In some embodiments, the OCCM task trainer can comprise a display configured to display the one or more compression suitability indicia.

In some embodiments, at least one of the one or more sensors comprises an accelerometer. In some embodiments, at least one of the one or more sensors comprises one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

In some embodiments, the OCCM task trainer can comprise a simulated rib cage disposed within the inner volume of the simulated chest cavity. In some embodiments, the OCCM task trainer can comprise one or more simulated lungs disposed within the inner volume of the simulated chest cavity. In some embodiments, the OCCM task trainer can comprise a simulated diaphragm disposed within the inner volume of the simulated chest cavity.

In some embodiments, at least one of the inlet port or the outlet port of the simulated heart comprises a one-way valve. In some embodiments, the simulated heart is dimensioned and configured to simulate a human heart.

According to another embodiment, a method for forming an open chest cardiac massage task trainer can be carried out, the method comprising forming a deformable bulb configured to cause a fluid to flow therethrough when compressed; forming, about the deformable bulb, from a deformable material, a simulated heart defining a first channel through a first side of the simulated heart and a second channel through a second side of the simulated heart, the first and second channels being in fluidic communication with the deformable bulb; disposing a first one-way valve in the first channel and a second one-way valve in the second channel to allow for unidirectional flow of fluid through the first and second channels and the deformable bulb; disposing one or more sensors on a surface of the simulated heart, the one or more sensors configured to sense one or more compression characteristics; and placing the one or more sensors in operable communication with analysis circuitry configured to analyze said one or more compression characteristics and determine one or more compression suitability indicia.

In some embodiments, the one or more compression characteristics can comprise at least one of: a force of compression, a speed of compression, a rate of compression, a depth of compression, a frequency of compression, an angle of compression, a compression direction, a compression volume output, a trainee's finger placement during the simulated open chest cardiac massage procedure, or a trainee's palm placement during the simulated open chest cardiac massage procedure.

In some embodiments, the method of forming the OCCM task trainer can further comprise forming a simulated chest cavity having an inner volume and defining an opening through a top portion of the simulated chest cavity. In some embodiments, the method of forming the OCCM task trainer can further comprise coupling the simulated chest cavity to one or more simulated spinal column sections. In some embodiments, the method of forming the OCCM task trainer can further comprise disposing the simulated heart within the inner volume of the simulated chest cavity.

In some embodiments, the method of forming the OCCM task trainer can comprise providing one or more fluid reservoirs configured to contain a fluid; and placing the bulb and the first and second channels of the simulated heart in fluidic communication with the one or more fluid reservoirs.

In some embodiments, the method of forming the OCCM task trainer can comprise providing one or more fluid reservoirs in fluidic communication with the bulb within the simulated heart, the one or more fluid reservoirs being configured to contain a fluid, provide the fluid to the bulb within the simulated heart, or receive the fluid from the bulb within the simulated heart.

In some embodiments, the method of forming the OCCM task trainer can further comprise disposing one or more simulated sternum portions and a multilayer and durometer rejuvenable polymer gel across the opening defined in the top portion of the simulated chest cavity.

According to another embodiment, a method for using an open chest cardiac massage (OCCM) task trainer can be carried out, the method comprising providing a task trainer. In some embodiments, the OCCM task trainer can comprise a simulated chest cavity defining an inner volume and an opening in a top surface of the simulated chest cavity; a simulated heart disposed within the inner volume of the simulated chest cavity, the simulated heart comprising a bulb surrounded by a deformable heart material, the bulb being in fluidic communication with an inlet port and an outlet port of the simulated heart and a reservoir configured to retain and provide a fluid; one or more sensors disposed on or within the simulated heart and configured to sense the force, speed, rate, depth, frequency, and/or direction of compression during open chest cardiac massage training; a flow sensor configured to sense a rate of flow of the fluid through the outlet port; analysis circuitry configured to receive sensor data from the one or more sensors and flow data from the flow sensor, and further configured to interpret the one or more compression characteristics and fluid flow rate data from the flow sensor to generate one or more compression suitability indicia. In some embodiments, the analysis circuitry can be configured to receive sensor data from the one or more sensors and flow data from the flow sensor, and further configured to interpret the sensor data and the flow data to generate one or more compression suitability indicia; and a display configured to receive display instructions from the analysis circuitry and to display the one or more compression suitability indicia.

In some embodiments, the method of using the OCCM task trainer can further comprise, in an instance in which a trainee manually compresses the simulated heart during a time period and causes communication of the fluid from the reservoir through the bulb within the simulated heart, receiving, at the analysis circuitry, the sensor data and the flow data associated with the time period. In some embodiments, the method of using the OCCM task trainer can further comprise interpreting the sensor data and the flow data to generate the one or more compression suitability indicia.

In some embodiments, the OCCM task trainer can further comprise one or more sternum portions disposed above the simulated chest cavity; and a multilayer and durometer rejuvenable polymer gel disposed over the sternum portions to simulate skin and subcutaneous tissue, the multilayer and durometer rejuvenable polymer gel being configured to be surgically cut to gain access to the sternum portions disposed above the simulated chest cavity. In some embodiments, the OCCM task trainer can further comprise one or more fluid reservoirs configured to contain or receive a fluid, each of the one or more fluid reservoirs being in fluidic communication with the inlet port or the outlet port of the simulated heart; and a flow sensor in fluidic communication with the outlet port of the simulated heart and configured to measure the flow rate and volume of fluid flowing through the outlet port of the simulated heart. In some embodiments, the analysis circuitry can be further configured to receive flow rate data from the flow sensor.

In some embodiments, the method of using the OCCM task trainer can further comprise sending display instructions from the analysis circuitry to the display to cause the display to display the one or more compression suitability indicia.

In some embodiments, the one or more sensors comprises one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:
1. An open chest cardiac massage (OCCM) task trainer comprising:
   a simulated chest cavity defining an inner volume and defining an opening in a top surface of the simulated chest cavity;

a simulated heart disposed within the inner volume of the simulated chest cavity, the simulated heart comprising a bulb surrounded by a deformable heart material, the bulb being in fluidic communication with an inlet port and an outlet port of the simulated heart;

a plurality of sensors, wherein a first portion of the plurality of sensors are disposed on the simulated heart and a second portion of the plurality of sensors are disposed within the simulated heart, wherein the first portion of the plurality of sensors are configured to sense one or more first compression characteristics from among a plurality of compression characteristics by a user of the OCCM task trainer during a simulated OCCM procedure, wherein the second portion of the plurality of sensors are configured to sense one or more second compression characteristics from among the plurality of compression characteristics during the simulated OCCM procedure, and wherein the plurality of compression characteristics are associated with a plurality of exerted compression directions;

a display configured to present a plurality of compression suitability indicia associated with the simulated OCCM procedure; and analysis circuitry in operable communication with the plurality of sensors and the display, the analysis circuitry configured to perform at least:
  receiving, from the first portion of the plurality of sensors, one or more first signals indicative of the one or more first compression characteristics,
  receiving, from the second portion of the plurality of sensors, one or more second signals indicative of the one or more second compression characteristics,
  determining, based on the one or more first signals received from the first portion of the plurality of sensors, the one or more first compression characteristics,
  determining, based on the one or more second signals received from the second portion of the plurality of sensors, the one or more second compression characteristics,
  determining, based on the one or more first compression characteristics and the one or more second compression characteristics, the plurality of compression suitability indicia associated with the simulated OCCM procedure; and
  providing, to the display, information associated with the plurality of compression suitability indicia associated with the simulated OCCM procedure to be presented to the user of the OCCM task trainer during the simulated OCCM procedure.

2. The OCCM task trainer of claim 1, wherein the plurality of compression characteristics comprise a force of compression and at least one of: a speed of compression, a rate of compression, a depth of compression, a frequency of compression, an angle of compression, a compression direction, a compression volume output, a finger placement by the user during the simulated OCCM procedure, or a palm placement by the user during the simulated OCCM procedure.

3. The OCCM task trainer of claim 1, further comprising:
one or more precut and wired shut sternum portions disposed above the simulated chest cavity; and
a multilayer and durometer rejuvenable polymer gel disposed over the one or more precut and wired shut sternum portions to simulate skin and subcutaneous tissue, the multilayer and durometer rejuvenable polymer gel being configured to be surgically cut by the user prior to the first portion of the simulated OCCM procedure for the user to gain access to the one or more precut and wired shut sternum portions disposed above the simulated chest cavity.

4. The OCCM task trainer of claim 3, further comprising:
one or more fluid reservoirs configured to contain or receive a fluid, each of the one or more fluid reservoirs being in fluidic communication with the inlet port or the outlet port of the simulated heart; and
a flow sensor in fluidic communication with the inlet port or the outlet port of the simulated heart, the flow sensor being configured to measure a flow rate of the fluid being communicated into the simulated heart or out the simulated heart,
wherein the analysis circuitry is further configured to receive, from the flow sensor, one or more signals indicative of flow rate data associated with the first portion of the simulated OCCM procedure.

5. The OCCM task trainer of claim 1, wherein at least one sensor of the plurality of sensors comprise at least one accelerometer.

6. The OCCM task trainer of claim 1, wherein the plurality of sensors comprise one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

7. The OCCM task trainer of claim 1, further comprising:
a simulated rib cage disposed within the inner volume of the simulated chest cavity;
one or more simulated lungs disposed within the inner volume of the simulated chest cavity; and
a simulated diaphragm disposed within the inner volume of the simulated chest cavity.

8. The OCCM task trainer of claim 1, wherein at least one of the inlet port or the outlet port of the simulated heart comprises a one-way valve.

9. The OCCM task trainer of claim 1, wherein the simulated heart is dimensioned and configured to simulate a human heart.

10. A method of forming an open chest cardiac massage (OCCM) task trainer, the method comprising:
forming a deformable bulb configured to cause a fluid to flow therethrough when compressed by a user of the OCCM task trainer during a simulated OCCM procedure;
forming, about the deformable bulb, from a deformable material, a simulated heart defining a first channel through a first side of the simulated heart and a second channel through a second side of the simulated heart, the first and second channels being in fluidic communication with the deformable bulb;
disposing a first one-way valve in the first channel and a second one-way valve in the second channel to allow for unidirectional flow of fluid through the first and second channels and the deformable bulb;
providing one or more fluid reservoirs configured to store the fluid prior to the simulated OCCM procedure;
placing the one or more reservoirs in fluidic communication with the deformable bulb via the first and second channels;
disposing one or more first sensors of a plurality of sensors on a surface of the simulated heart, wherein the plurality of sensors are configured to sense a plurality of compression characteristics associated with a plurality of exerted compression directions, wherein the one or more first sensors are configured to sense one or more first compression characteristics of the plurality of compression characteristics;
disposing one or more second sensors of the plurality of sensors within the simulated heart, the one or more second sensors being configured to sense one or more second compression characteristics of the plurality of compression characteristics;
placing the first one or more sensors and the second one or more sensors in operable communication with analysis circuitry configured, during the simulated OCCM procedure, to analyze said one or more first compression characteristics to determine one or more first compression suitability indicia associated with the simulated OCCM procedure and further configured to analyze said one or more second compression characteristics to determine one or more second compression suitability indicia associated with the simulated OCCM procedure; and
placing the analysis circuitry in operable communication with a display, the display configured to display, to a user of the OCCM task trainer, during the simulated OCCM procedure, the one or more first compression suitability indicia and the one or more second compression suitability indicia associated with the simulated OCCM procedure.

11. The method of claim 10, wherein the plurality of compression characteristics comprise a force of compression and at least one of: a speed of compression, a rate of compression, a depth of compression, a frequency of compression, an angle of compression, a compression direction, a compression volume output, a finger placement by the user during the simulated OCCM procedure, or a palm placement by the user during the simulated OCCM procedure.

12. The method of claim 10, further comprising:
forming a simulated chest cavity having an inner volume and defining an opening through a top portion of the simulated chest cavity;
coupling the simulated chest cavity to one or more simulated spinal column sections; and
disposing the simulated heart within the inner volume of the simulated chest cavity.

13. The method of claim 10, further comprising:
providing one or more fluid reservoirs configured to contain a fluid; and
placing the bulb and the first and second channels of the simulated heart in fluidic communication with the one or more fluid reservoirs.

14. The method of claim 12, further comprising:
disposing one or more precut and wired shut sternum portions and a multilayer and durometer rejuvenable polymer gel across the opening defined in the top portion of the simulated chest cavity.

15. A method for using an open chest cardiac massage (OCCM) task trainer, the method comprising:
providing the OCCM task trainer, the OCCM task trainer comprising:
a simulated chest cavity defining an inner volume and an opening in a top surface of the simulated chest cavity;
a simulated heart disposed within the inner volume of the simulated chest cavity, the simulated heart comprising a bulb surrounded by a deformable heart material, the bulb being in fluidic communication with an inlet port and an outlet port of the simulated heart and a reservoir configured to retain and provide a fluid;
a plurality of sensors, wherein a first portion of the plurality of sensors are disposed on the simulated heart and a second portion of the plurality of sensors are disposed within the simulated heart, wherein the first portion of the plurality of sensors are configured to sense one or more first compression characteristics from among a plurality of compression characteristics by a user of the OCCM task trainer during a simulated OCCM procedure, wherein the second portion of the plurality of sensors are disposed within the simulated heart, wherein the second portion of the plurality of sensors are configured to sense one or more second compression characteristics of the plurality of compression characteristics by the user of the OCCM task trainer during the simulated OCCM procedure, and wherein the plurality of compression characteristics are associated with a plurality of exerted compression directions by the user during the simulated OCCM procedure;
a flow sensor configured to sense a rate of flow of the fluid through the outlet port during the simulated OCCM procedure, the flow sensor being further configured to generate flow sensor data;
analysis circuitry in operable communication with the plurality of sensors and the flow sensor during the simulated OCCM procedure; and
a display in operable communication with the analysis circuitry and configured to information associated with the simulated OCCM procedure to a user of the OCCM task trainer during the simulated OCCM procedure;
in response to the user manually compressing the simulated heart during a first portion of the simulated OCCM procedure, which causes at least a portion of the fluid to be fluidically communicated from the reservoir and through the bulb within the simulated heart, receiving, at the analysis circuitry, first sensor data from the first portion of the plurality of sensors, second sensor data from the second portion of the plurality of sensors, and the flow sensor data from the flow sensor;
determining, based on the first sensor data, the second sensor data, and the flow sensor data, a plurality of compression suitability indicia associated with the first portion of the simulated OCCM procedure; and
displaying to the user of the OCCM task trainer, via the display, during a second portion of the simulated OCCM procedure subsequent to the first portion of the simulated OCCM procedure, the plurality of compression suitability indica associated with the first portion of the simulated OCCM procedure.

16. The method of claim 15, wherein the OCCM task trainer further comprises:
one or more precut and wired shut sternum portions disposed above the simulated chest cavity; and
a multilayer and durometer rejuvenable polymer gel disposed over the one or more precut and wired shut sternum portions to simulate skin and subcutaneous tissue, the multilayer and durometer rejuvenable polymer gel being configured to be surgically cut to gain access to the one or more precut and wired shut sternum portions disposed above the simulated chest cavity.

17. The method of claim 15, wherein at least one of the first one or more sensors or the second one or more sensors comprises one or more of: a flex sensor, a bend sensor, a force sensor, a force transducer, a pressure sensor, a pressure transducer, a load sensor, a hydraulic force sensor, a pneumatic force sensor, a piezoelectric force sensor, a capacitive force sensor, or a force sensitive resistor.

18. The method of claim 15, wherein the plurality of compression characteristics comprise a force of compression and at least one of: a speed of compression, a rate of compression, a depth of compression, a frequency of compression, an angle of compression, a compression direction, a compression volume output, a trainee's finger placement during the simulated open chest cardiac massage procedure, or a trainee's palm placement during the simulated open chest cardiac massage procedure.

19. The OCCM task trainer of claim 1, wherein the first portion of the plurality of sensors disposed on the simulated heart comprise a plurality of sensors configured to sense a presence or an absence of skin of the user at a plurality of compression locations on an outer surface of the deformable heart material during the simulated OCCM procedure, and wherein the second portion of the plurality of sensors disposed within the simulated heart are configured to sense an extent of deformation of the deformable heart material beneath the plurality of compression locations during the simulated OCCM procedure.

20. The method of claim 10, wherein the first one or more sensors comprise a flex sensor or a bend sensor, and wherein the second one or more sensors comprise a force sensor or a pressure sensor.

* * * * *